United States Patent
Su et al.

(10) Patent No.: US 12,470,023 B2
(45) Date of Patent: Nov. 11, 2025

(54) CONNECTOR, ELECTRONIC DEVICE AND OPEN PLUGGABLE SPECIFICATION (OPS) DEVICE

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Zhangyue Su, Guangzhou (CN); Xueya Yang, Guangzhou (CN); Minxiang Hou, Guangzhou (CN); Jiangwu Chen, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 647 days.

(21) Appl. No.: 17/696,839

(22) Filed: Mar. 16, 2022

(65) Prior Publication Data
US 2022/0209467 A1 Jun. 30, 2022

Related U.S. Application Data

(63) Continuation of application No. PCT/CN2020/099775, filed on Jul. 1, 2020.

(30) Foreign Application Priority Data

Sep. 30, 2019 (CN) .......................... 201910940472.8

(51) Int. Cl.
*H01R 12/00* (2006.01)
*H01R 12/72* (2011.01)
(Continued)

(52) U.S. Cl.
CPC ....... *H01R 13/6471* (2013.01); *H01R 12/722* (2013.01); *H01R 13/11* (2013.01); *H05K 1/117* (2013.01); *H01R 2201/06* (2013.01)

(58) Field of Classification Search
CPC .. H01R 13/6471; H01R 12/722; H01R 13/11; H01R 2201/06; H01R 12/73;
(Continued)

(56) References Cited

U.S. PATENT DOCUMENTS 7,331,816 B2 * 2/2008 Krohn ................ H01R 13/6471
                                                    439/502
7,485,008 B1 * 2/2009 Yi .......................... H01R 24/60
                                                    439/660

(Continued)

FOREIGN PATENT DOCUMENTS

| CN | 202585840 U | 12/2012 |
| CN | 203416348 U | 1/2014 |
| CN | 206863661 U | 1/2018 |

OTHER PUBLICATIONS

European Search Report issued in corresponding European application No. 20871372.7, dated Sep. 12, 2022, 6 pages.
(Continued)

*Primary Examiner* — Abdullah A Riyami
*Assistant Examiner* — Nelson R. Burgos-Guntin
(74) *Attorney, Agent, or Firm* — BAYES PLLC

(57) ABSTRACT

Embodiments of the present disclosure provide a connector, an electronic device and an open pluggable specification (OPS) device. The connector includes a plurality of first pins and a plurality of second pins. A pair of adjacent first pins are configured to transmit a first signal. The plurality of the second pins are arranged on both sides of the pair of the first pins. The plurality of the second pins are configured to be
(Continued)

grounded or transmit a second signal. A transmission rate of the first signal is greater than that of the second signal.

20 Claims, 16 Drawing Sheets

(51) Int. Cl.
*H01R 13/11* (2006.01)
*H01R 13/6471* (2011.01)
*H05K 1/11* (2006.01)

(58) Field of Classification Search
CPC ...... H01R 13/02; H05K 1/117; H05K 1/0219; H05K 1/0245; H05K 2201/10325; H05K 1/111
See application file for complete search history.

(56) References Cited

U.S. PATENT DOCUMENTS

| | | | | |
|---|---|---|---|---|
| 8,176,214 | B2* | 5/2012 | Jones | G09G 5/006 |
| | | | | 710/16 |
| 8,862,791 | B2* | 10/2014 | Tao | H04N 21/43635 |
| | | | | 710/16 |
| 8,886,852 | B2* | 11/2014 | Bar-Niv | G09G 5/006 |
| | | | | 710/16 |
| 10,063,011 | B2* | 8/2018 | Wanner | H01R 13/641 |
| 10,152,447 | B2* | 12/2018 | Lai | G06F 13/4081 |
| 11,799,246 | B2* | 10/2023 | Johnescu | H01R 12/716 |
| 2007/0212927 | A1* | 9/2007 | Krohn | H01R 13/6471 |
| | | | | 439/489 |
| 2009/0203259 | A1 | 8/2009 | Nguyen et al. | |
| 2011/0125601 | A1* | 5/2011 | Carpenter | G06Q 30/0631 |
| | | | | 705/26.1 |
| 2015/0011104 | A1* | 1/2015 | Lee | H01R 13/652 |
| | | | | 439/108 |
| 2016/0043508 | A1 | 2/2016 | Helster et al. | |
| 2017/0139871 | A1 | 5/2017 | Yeh | |
| 2022/0209467 | A1* | 6/2022 | Su | H01R 13/11 |

OTHER PUBLICATIONS

Examination Report issued in corresponding Australian application No. 2020359756, dated Dec. 9, 2022, 3 pages.
Examination Report issued in corresponding Indian application No. 202217009418, date Feb. 14, 2023, 6 pages.
Notice of Reasons for Rejection issued in corresponding Japanese application No. JP2022-519246, 5 pages.
Communication pursuant to Article 94(3) EPC issued in corresponding European application No. 20871372.7, dated Nov. 14, 2024, 8 pages.

* cited by examiner

| No. | Pin |
|---|---|
| 1 | Second pin |
| 2 | First pin |
| 3 | First pin |
| 4 | Second pin |
| 5 | First pin |
| 6 | First pin |
| 7 | Second pin |

Fig. 1

| No. | Pin |
|---|---|
| 1 | PC-HDMI-DDC-CLK |
| 2 | HDMI-5V |
| 3 | PC-HDMI-CLKN |
| 4 | PC-HDMI-CLKP |
| 5 | GND |
| 6 | PC-HDMI-TXN0 |
| 7 | PC-HDMI-TXP0 |
| 8 | GND |
| 9 | PC-HDMI-TXN1 |
| 10 | PC-HDMI-TXP1 |
| 11 | GND |
| 12 | PC-HDMI-TXN2 |
| 13 | PC-HDMI-TXP2 |
| 14 | HPD |
| 15 | PC-HDMI-DDC-DATA |

Fig. 2

| No. | Pin |
|---|---|
| 1 | GND |
| 2 | U3.0-RXP1-R |
| 3 | U3.0-RXN1-R |
| 4 | GND |
| 5 | U3.0-TXP1-R |
| 6 | U3.0-TXN1-R |
| 7 | PC-UART-TX |

Fig. 3

| No. | Pin |
|-----|-----|
| 1 | |
| 2 | 3.3V-STB |
| 3 | L2-TDI-P0 |
| 4 | L2-TDI-N0 |
| 5 | GND |
| 6 | L2-TDI-P1 |
| 7 | L2-TDI-N1 |
| 8 | GND |
| 9 | L2-TDI-P2 |
| 10 | L2-TDI-N2 |
| 11 | GND |
| 12 | L2-TDI-P3 |
| 13 | L2-TDI-N3 |
| 14 | GND |
| 15 | |

Fig. 4

| No. | Pin |
|---|---|
| 1 | GND |
| 2 | USB2.0+#1 |
| 3 | USB2.0-#1 |
| 4 | PWR-BTN |
| 5 | USB2.0+#2 |
| 6 | USB2.0-#2 |
| 7 | PC-UART-RX |

Fig. 5

| MF-A | GND | | | | | | | | | | | | | | | | | | | GND | MF-A |
|---|---|---|---|---|---|---|---|---|---|---|---|---|---|---|---|---|---|---|---|---|---|
| MF-B | DC-18V (3A) | | | | | | | | | | | | | | | | | | | DC-18V (3A) | MF-B |
| | | 21 | 22 | 23 | 24 | 25 | 26 | 27 | 28 | 29 | 30 | 31 | 32 | 33 | 34 | 35 | 36 | 37 | 38 | 39 | 40 |
| | | PC-HDMI-DDC-DATA | 3.3V-STB | L2-TDI-P0 | L2-TDI-N0 | GND | L2-TDI-P1 | L2-TDI-N1 | GND | L2-TDI-P2 | L2-TDI-N2 | GND | L2-TDI-P3 | L2-TDI-N3 | GND | USB2.0-#1 | USB2.0+#1 | PWR-BTN | USB2.0-#2 | USB2.0+#2 | PC-UART-RX |
| | | PC-HDMI-DDC-CLK | HDMI-5V | PC-HDMI-CLKN | PC-HDMI-CLKP | GND | PC-HDMI-TXN0 | PC-HDMI-TXP0 | GND | PC-HDMI-TXN1 | PC-HDMI-TXP1 | GND | PC-HDMI-TXN2 | PC-HDMI-TXP2 | HPD | U3.0-RXP1-R | U3.0-RXN1-R | GND | U3.0-TXP1-R | U3.0-TXN1-R | PC-UART-TX |
| | | 1 | 2 | 3 | 4 | 5 | 6 | 7 | 8 | 9 | 10 | 11 | 12 | 13 | 14 | 15 | 16 | 17 | 18 | 19 | 20 |
| MF-A | GND | | | | | | | | | | | | | | | | | | | GND | MF-A |
| MF-B | DC-18V (3A) | | | | | | | | | | | | | | | | | | | | |

Fig. 6

| 1 | PC-HDMI-DDC-CLK | 16 | |
|---|---|---|---|
| 2 | HDMI-5V | 17 | 3.3V-STB |
| 3 | PC-HDMI-CLKN | 18 | L2-TDI-P0 |
| 4 | PC-HDMI-CLKP | 19 | L2-TDI-N0 |
| 5 | GND | 20 | GND |
| 6 | PC-HDMI-TXN0 | 21 | L2-TDI-P1 |
| 7 | PC-HDMI-TXP0 | 22 | L2-TDI-N1 |
| 8 | GND | 23 | GND |
| 9 | PC-HDMI-TXN1 | 24 | L2-TDI-P2 |
| 10 | PC-HDMI-TXP1 | 25 | L2-TDI-N2 |
| 11 | GND | 26 | GND |
| 12 | PC-HDMI-TXN2 | 27 | L2-TDI-P3 |
| 13 | PC-HDMI-TXP2 | 28 | L2-TDI-N3 |
| 14 | HPD | 29 | GND |
| 15 | PC-HDMI-DDC-DATA | 30 | |

Fig. 9

| 1 | HPD | 8 | GND |
|---|---|---|---|
| 2 | U3.0-RXP1-R | 9 | USB2.0+#1 |
| 3 | U3.0-RXN1-R | 10 | USB2.0-#1 |
| 4 | GND | 11 | PWR-BTN |
| 5 | U3.0-TXP1-R | 12 | USB2.0+#2 |
| 6 | U3.0-TXN1-R | 13 | USB2.0-#2 |
| 7 | PC-UART-TX | 14 | PC-UART-RX |

Fig. 11

CONNECTOR, ELECTRONIC DEVICE AND OPEN PLUGGABLE SPECIFICATION (OPS) DEVICE

CROSS-REFERENCE TO RELATED APPLICATION

The present application is a continuation of International Application No. PCT/CN2020/099775, filed on Jul. 1, 2020, which claims the benefit of priority to Chinese Patent Application No. 201910940472.8, filed on Sep. 30, 2019, both of which are incorporated herein by reference in their entireties.

TECHNICAL FIELD

The present disclosure relates to the field of connectors, in particular to a connector, an electronic device and an open pluggable specification (OPS) device.

BACKGROUND

With the diversification of electronic devices, in order to achieve data exchange between two electronic devices, it is usually necessary to use a connector to connect the two electronic devices.

Taking open pluggable specification (OPS) electronic devices as an example, the application of OPS computers is usually implemented in two parts, the first part is an OPS computer, and the second part is an OPS connector. The OPS connector is a bridge connecting the OPS computer and the internal circuit of an all-in-one machine, and can supply an internal power supply of the all-in-one machine to the OPS computer through an OPS interface. The OPS computer and the all-in-one machine can realize transmission of HDMI (High Definition Multimedia Interface) signal, audio signal and USB (Universal Serial Bus) data signal through the connector, and thus, the OPS computer and the all-in-one machine can be connected and used by plugging and unplugging.

A plurality of pins is arranged in the connector, and a pair of adjacent pins are configured to transmit high speed differential signals such as HDMI video signals and USB data signals. Due to the small size of the connector and the small spacing between adjacent pins, the mutual inductance and mutual capacitance between two adjacent pairs of pins used for transmitting different differential signals will form crosstalk and affect the integrity of signal transmission, and excessive crosstalk may cause false triggering of the circuit, which causes the system to fail to work normally.

SUMMARY

Embodiments of the present disclosure provide a connector, an electronic device, and an open pluggable specification (OPS) device, a second pin is multiplexed as a pin for isolating ground while transmitting a second signal, which reduces the number of grounding pins used for grounding, reduces the production cost and reduces the crosstalk between first signals transmitted on two adjacent pairs of first pins.

In a first aspect, an embodiment of the present disclosure provides a connector, the connector includes a plurality of first pins and a plurality of second pins. A pair of adjacent first pins are configured to transmit a first signal. The plurality of the second pins are configured to be grounded or transmit a second signal. The plurality of the second pins are arranged on both sides of the pair of the first pins. A transmission rate of the first signal is greater than that of the second signal.

In the second aspect, an embodiment of the present disclosure provides an electronic device including a connector provided by the first aspect.

In the third aspect, an embodiment of the present disclosure provides an OPS device including an OPS computer host and an all-in-one machine. The OPS computer host includes a first connector. The first connector includes a male plug. The male plug includes a plurality of first pins and a plurality of second pins. A pair of adjacent first pins are configured to transmit a host signal generated by the OPS computer host to the all-in-one machine, or receive an external signal from the all-in-one machine. The plurality of the second pins are configured to be grounded, or receive a first target signal from the all-in-one machine, or transmit a second target signal to the all-in-one machine. The plurality of the second pins are arranged on both sides of a pair of the first pins. Transmission rates of the host signal and the external signal are greater than those of the first target signal and the second target signal. The all-in-one machine includes a second connector. The second connector includes a female plug. The male plug is configured to insert into the female plug. The female plug includes a plurality of third pins and a plurality of fourth pins. A pair of adjacent third pins are configured to transmit the external signal generated by the all-in-one machine to the OPS computer host, or receive the host signal from the OPS computer host. The plurality of the fourth pins are configured to be grounded, or receive a second target signal from the OPS computer host, or transmit a first target signal to the OPS computer host. The plurality of the fourth pins are arranged on both sides of the pair of the third pins.

The connector provided by the embodiments of the present disclosure includes a plurality of first pins and a plurality of second pins. A pair of adjacent first pins are configured to transmit a high-speed first signal. The plurality of the second pins are arranged on both sides of the pair of the first pins. The plurality of the second pins are configured to be grounded or transmit a low-speed second signal. The second pins used for transmitting a low-speed second signal also play a role of isolating ground while transmitting the second signal, and are multiplexed as pins for isolating ground, which reduce the number of grounding pins used for grounding, and reduce the production cost. And the plurality of the second pins are arranged on both sides of the pair of the first pins, and wrap the pair of first pins to be grounded, thereby reducing crosstalk between the first signals transmitted on two adjacent pairs of first pins.

BRIEF DESCRIPTION OF DRAWINGS

Hereinafter, the present disclosure will be further described in detail based on the drawings and embodiments.

FIG. 1 is a schematic diagram of a pin layout provided by embodiments of the present disclosure.

FIG. 2 is a schematic diagram of another pin layout provided by embodiments of the present disclosure.

FIG. 3 is a schematic diagram of another pin layout provided by embodiments of the present disclosure.

FIG. 4 is a schematic diagram of another pin layout provided by embodiments of the present disclosure.

FIG. 5 is a schematic diagram of another pin layout provided by embodiments of the present disclosure.

FIG. 6 is a schematic diagram of another pin layout provided by embodiments of the present disclosure.

FIG. 9 is a schematic diagram of a pin layout of a socket corresponding to the circuit board of FIG. 8.

FIG. 11 is a schematic diagram of a pin layout of a socket corresponding to the circuit board of FIG. 10.

DETAILED DESCRIPTION

Figure 7:
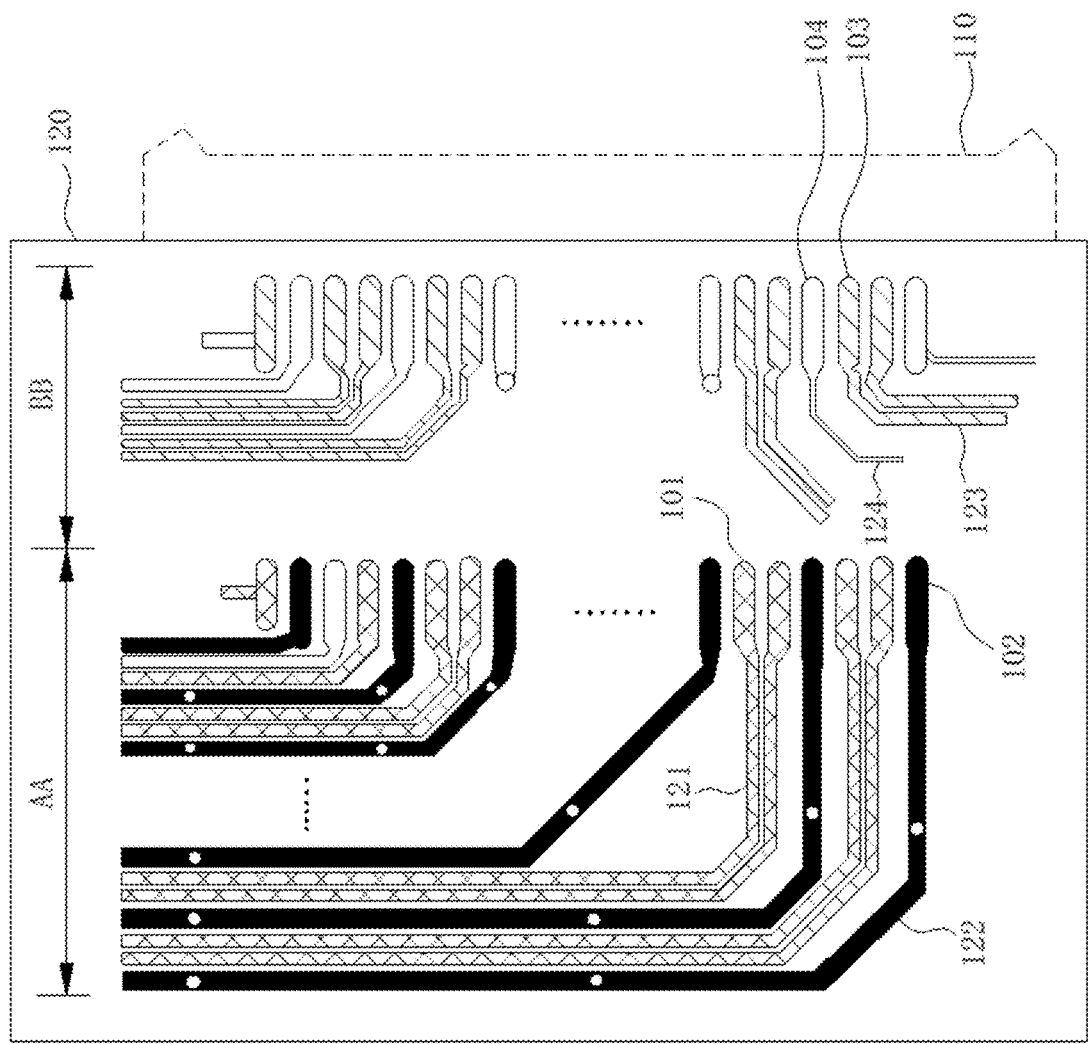
FIG. 7 is a schematic structure diagram of a circuit board provided by embodiments of the present disclosure.

In order to make the technical problems solved by the present disclosure, the adopted technical solutions, and the achieved technical effects more clear, the technical solutions of embodiments of the present disclosure will be described in further detail in conjunction with the accompanying drawings hereinafter. It goes without saying that the described embodiments are only some embodiments of the present disclosure, not all embodiments. Based on the embodiments in the present disclosure, all other embodiments obtained by those skilled in the art without creative work shall fall within the claimed scope of the present disclosure.

In the description of the present disclosure, unless expressly stipulated and limited otherwise, the terms "in connection", "connect", and "fix" shall be interpreted broadly, for example, they may be fixedly connected, detachably connected, or integrated; they may be mechanically connected or electrically connected, and may be directly connected or indirectly connected through an intermediate medium, and may be an internal communication between two components or an interaction relationship between two components. For those skilled in the art, the specific meaning of the above-mentioned terms in the present disclosure can be understood under specific circumstances.

In the present disclosure, unless expressly stipulated and defined otherwise, a first feature being "above" or "below" a second feature may include direct contact between the first and second features, or may also include non-direct contact but through other features between the first and second features. Moreover, the first feature being "on," "above," and "on top of" the second feature includes the first feature being directly above and obliquely above the second feature, or it simply means that the level of the first feature is higher than that of the second feature. The first feature being "below," "under," and "beneath" the second feature includes the first feature being directly below and obliquely below the second feature, or it simply means that the level of the first feature is lower than that of the second feature.

In general, terminology may be understood at least in part from usage in context. For example, terms, such as "a," "an," or "the," again, may be understood to convey a singular usage or to convey a plural usage, depending at least in part upon context. Similarly, the use of the singular form of any word may include the plural, depending at least in part upon context, and vice versa.

Embodiment 1

An embodiment of the present disclosure provides a connector, which is configured to connect two or more electronic devices. The connector can be directly arranged in an electronic device, or may be arranged in a data cable. There is no restriction on this.

Taking the connector arranged in an electronic device as an example, the connector includes a socket, the socket includes at least a plurality of first pins and a plurality of second pins, the first pins and the second pins can be welded to a mainboard of an electronic device. Thereinto, the first pins and the second pins both belong to pins, that is, an interface mode provided by the electronic device to the outside.

If the socket is a male plug, the socket further includes contact pins correspondingly connected with respective pins.

If the socket is a female plug, the socket further includes jacks correspondingly connected with respective pins.

The contact pins of the male plug match the jacks of the female plug, the male plug is arranged on one of the electronic devices, the female plug is arranged on the other electronic device, and the two electronic devices are connected in a pluggable manner through the male plug and the female plug.

The first pins and the second pins can be adapted to a shape of the socket and arranged along one column or two or more columns. A pair of adjacent first pins is configured to transmit a first signal, and the first signal can be a differential signal. A pair of adjacent first pins refers to two adjacent first pins, and there is no pin between the two first pins. Thereinto, the two signals in the differential signal have a same amplitude and opposite phases. One first pin in the pair of first pins is configured to transmit one signal in the differential signal, and the other first pin in the pair of first pins is configured to transmit the other signal in the differential signal.

A plurality of second pins are arranged on both sides of a pair of first pins, that is, one side of the pair of first pins is a second pin, and the other side of the pair of first pins is another second pin, so that two second pins surround/wrap the pair of first pins.

The second pin is configured to be grounded or transmit a second signal, wherein a transmission rate of the first signal is greater than that of the second signal.

Hereinafter, the present disclosure will be described through specific embodiments.

FIG. 1 is a schematic diagram of a pin layout provided by an embodiment of the present disclosure. As shown in FIG. 1, the socket includes at least 7 pins. The 7 pins are arranged in a column, which are Pin No. 1, Pin No. 2, Pin No. 3, Pin No. 4, Pin No. 5, Pin No. 6, and Pin No. 7 from top to bottom. Thereinto, Pin No. 1 is a second pin, which is configured to be grounded; the adjacent Pin No. 2 and Pin No. 3 are a pair of first pins, which are configured to transmit a first signal; Pin No. 4 is a second pin, which is configured to transmit a second signal; adjacent Pin No. 5 and Pin No. 6 are a pair of first pins, which are configured to transmit another first signal; Pin No. 7 is a second pin, which is configured to transmit another second signal.

The transmission rate of the first signal is greater than that of the second signal. Exemplarily, the first signal may be a high speed differential signal, and the high speed differential signal may include a network data signal, a USB 2.0 data signal, a USB 3.0 data signal, and an HDMI video signal. The second signal is a low speed signal, and the low speed signal may include low speed signals such as an HDMI power signal, a standby control signal, a Hot Plug Detect (HPD) signal, a Display Data Channel (DDC) signal, a serial port data signal, and a power switch control signal.

Pin No. 4 is configured to transmit a low-speed second signal when Pin No. 2 and Pin No. 3 transmit high speed differential signals, and Pin No. 7 is configured to transmit a low-speed second signal when Pin No. 5 and Pin No. 6 transmit high speed differential signals. Since the low speed signal plays a role of grounding relative to the high-speed signal, the second pin used for transmitting the low-speed second signal is also configured to play a role of isolating ground while transmitting the second signal, and multiplex as a pin for isolating ground, which reduces the number of grounding pins used for grounding. A plurality of the second pins are arranged on both sides of a pair of the first pins, and wrap the pair of first pins to be grounded (that is, the pair of first pins are surrounded by pins for isolating ground), thereby avoiding crosstalk between the differential signals transmitted on two adjacent pairs of first pins. Thereinto, the two adjacent pairs of first pins refer to two pairs of first pins, and a second pin is arranged between the two pairs of first pins.

It should be noted that, in the above embodiment, the positions of the second pin (Pin No. 1) used for grounding, the second pin (Pin No. 4) used for transmitting the second signal, and the second pin (Pin No. 7) used for transmitting the second signal can be interchanged. For example, Pin No. 1 is a second pin for transmitting the second signal, Pin No. 4 is a second pin for grounding, and Pin No. 7 is a second pin for transmitting the second signal. They are not limited to the embodiments of the present disclosure, as long as a plurality of second pins are arranged on both sides of a pair of first pins.

In the connector provided by the embodiments of the present disclosure, the connector includes a plurality of first pins and a plurality of second pins, a pair of the adjacent first pins are configured to transmit a high-speed first signal, a plurality of the second pins are arranged on both sides of a pair of the first pins, the second pins are configured to be grounded or transmit a low-speed second signal, the second pins used for transmitting a low-speed second signal also play a role of isolating ground while transmitting the second signal, and are multiplexed as pins for isolating ground, which reduces the number of grounding pins used for grounding and reduces the production cost. Moreover, a plurality of the second pins are arranged on both sides of a pair of the first pins, which wrap the pair of first pins to be grounded, thereby reducing crosstalk between the first signals transmitted on two adjacent pairs of first pins.

In some embodiments, as shown in FIG. 2, the first pins and the second pins can be adapted to the shape of the socket and arranged along one column or two or more columns. The four pairs of first pins are HDMI pins and a pair of adjacent first pins are a pair of HDMI pins, and a pair of HDMI pins are configured to transmit a pair of HDMI differential signals. A pair of adjacent first pins refer to two adjacent first pins, and there is no pin between the two first pins. The second pins located on both sides of the HDMI pins include an HDMI power pin, three grounding pins, and a hot plug detection pin.

The HDMI pin is configured to transmit an HDMI video signal. In this embodiment, the HDMI video signal includes a total of four pairs of differential signals, which are respectively transmitted by four pairs of HDMI pins.

The HDMI power pin is configured to transmit an HDMI power signal when the HDMI pin transmits the HDMI video signal. Thereinto, the HDMI video signal is a Transition-Minimized Differential Signaling (TMDS) signal. If it is to be converted to an analog RGB signal, such as a Video Graphics Array (VGA) signal, a chip is required to complete the work, and the work of the chip needs power supply, so that the connector for converting HDMI to VGA needs to have an HDMI power pin to provide an HDMI power signal for the chip.

The grounding pin is configured to be grounded.

The hot plug detection pin is configured to transmit a hot plug detection signal when the HDMI pin transmits the HDMI video signal. The hot plug detection signal is a detection signal output from a display and transmitted to a computer host. The function of hot plug detection is that when a display, such as a digital display, is connected with or disconnected from a computer host through an interface, the computer host can detect this event through the hot plug detection pin and make a response.

It should be noted that in the above embodiments, the positions of the HDMI power pin, the three grounding pins, and the hot plug detection pin can be interchanged, and the HDMI power pin and hot plug detection pin can also be replaced by another second pin used for transmitting the low-speed second signal, as long as two second pins are respectively located on both sides of a pair of first pins, which is not limited to the embodiments of the present disclosure.

The first pins further includes two DDC pins, which are a DDC clock pin and a DDC data pin, respectively, and the DDC pins are configured to transmit a DDC signal. DDC is a specification used by a display to inform display information (such as resolution, scanning frequency, etc.) of a personal computer host, that is, the communication method between the display and the computer host.

Specifically, FIG. 2 is a schematic diagram of another pin layout provided by an embodiment of the present disclosure. As shown in FIG. 2, in this embodiment, the socket includes at least 15 pins, and the 15 pins are arranged in a column, which are numbered as Nos. 1-15 in sequence from top to bottom. Thereinto, Pin No. 1 is a first pin, specifically the DDC clock pin, which is configured to transmit a DDC clock signal. Pin No. 2 is a second pin, specifically the HDMI power pin, which is configured to transmit an HDMI power signal (second signal) when an HDMI video signal (first signal) is transmitted on the HDMI pin. Adjacent Pin Nos. 3 and 4 are first pins, specifically a pair of HDMI pins, which are configured to transmit an HDMI clock signal (the first signal). Pin No. 5 is a second pin, which is configured to be grounded. Adjacent Pin Nos. 6 and 7 are first pins, specifically a pair of HDMI pins, which are configured to transmit an HDMI video signal (first signal). Exemplarily, Pin Nos. 6 and 7 can be configured to transmit a red video signal. Pin No. 8 is a second pin, which is configured to be grounded. Adjacent Pin Nos. 9 and 10 are first pins, specifically a pair of HDMI pins, which are configured to transmit an HDMI video signal (first signal). Exemplarily, Pin Nos. 9 and 10 can be configured to transmit a green video signal. Pin No. 11 is a second pin, which is configured to be grounded. Adjacent Pin Nos. 12 and 13 are first pins, specifically a pair of HDMI pins, which are configured to transmit an HDMI video signal (first signal). Exemplarily, Pin Nos. 12 and 13 can be configured to transmit a blue video signal. Pin No. 14 is a second pin, specifically a hot plug detection pin, which is configured to transmit the hot plug detection signal (the second signal) when the HDMI pins transmit the HDMI video signals. Pin No. 15 is a first pin, specifically the DDC data pin, which is configured to transmit a DDC data signal.

In this embodiment, the HDMI power pin transmits a low-speed HDMI power signal when the HDMI pins transmit high-speed HDMI video signals, and the hot plug detection pin transmits the low-speed hot plug detection signal when the HDMI pins transmit the high-speed HDMI video signals. The HDMI power pin and hot plug detection pin are multiplexed as pins for isolating ground, which reduces the number of grounding pins used for grounding, and reduces production costs. Two second pins are located on both sides of a pair of HDMI pins to wrap the pair of HDMI pins to be grounded, so as to reduce the crosstalk between the first signals transmitted on two adjacent pairs of HDMI pins.

In some embodiments, the first pins and the second pins can be adapted to the shape of the socket and arranged along one column or two or more columns. Two pairs of first pins are USB 3.0 pins, and second pins located on both sides of the USB 3.0 pins include a serial port data sending pin and a grounding pin. A pair of adjacent first pins are a pair of USB 3.0 pins, and a pair of USB 3.0 pins are configured to transmit a pair of USB 3.0 differential signals. A pair of adjacent first pins refer to two adjacent first pins, and there is no pin between the two first pins.

A USB 3.0 pin is configured to transmit a USB 3.0 data signal. In this embodiment, the USB 3.0 data signal includes two pairs of differential signals, which are respectively transmitted by two pairs of USB 3.0 pins.

The grounding pin is configured to be grounded.

The serial port data sending pin is configured to transmit a serial port data signal when the USB 3.0 pins transmit the USB 3.0 data signals. A universal asynchronous receiver/transmitter (UART) is an asynchronous receiver/transmitter, which is a part of computer hardware. It converts the data to be transmitted between serial communication and parallel communication. UART transmits the data bit by bit through the serial port data sending pin with characters as the transmission unit, and the time interval between two characters in communication is not fixed, but the time interval between two adjacent bits in the same character is fixed. The data transmission rate is expressed by the baud rate, which refers to the times of carrier parameter changes per unit time, or the number of binary digits transmitted per second.

It should be noted that in the above embodiment, the positions of the serial port data sending pin and the grounding pin can be interchanged, and the serial port data sending pin can also be replaced by another second pin used for transmitting a low-speed second signal, as long as two second pins are respectively located on both sides of a pair of first pins, which is not limited to the embodiments of the present disclosure.

Specifically, FIG. 3 is a schematic diagram of another pin layout provided by an embodiment of the present disclosure. Referring to FIG. 3 of the present disclosure, the socket includes at least 7 pins, and the 7 pins are arranged in a column, which are numbered as Nos. 1-7 in sequence from top to bottom. Thereinto, Pin No. 1 is a second pin, which is configured to be grounded. Adjacent Pin Nos. 2 and 3 are first pins, specifically a pair of USB 3.0 pins, which are configured to transmit a USB 3.0 data signal (first signal). Pin No. 4 is a second pin, which is configured to be grounded. Adjacent Pin Nos. 5 and 6 are first pins, specifically a pair of USB 3.0 pins, which are configured to transmit a USB 3.0 data signal (first signal). Pin No. 7 is a second pin, specifically a serial port data sending pin, which is configured to transmit a serial port data (second signal) when the USB 3.0 pins transmit the USB 3.0 data signals.

In this embodiment, the serial port data sending pin transmits a low-speed serial port data signal when the USB 3.0 pins transmit the high-speed USB3.0 data signals. The serial port data sending pin is multiplexed as a pin for isolating ground, which reduces the number of grounding pins used for grounding, and reduces production costs. A plurality of second pins are arranged on both sides of a pair of USB 3.0 pins, and wrap the pair of USB 3.0 pins to be grounded, so as to reduce the crosstalk between the first signals transmitted on two adjacent pairs of USB 3.0 pins.

In some embodiments, as shown in FIG. 4, the first pins and the second pins can be adapted to the shape of the socket and arranged along one column or two or more columns. Four pairs of first pins are network data pins. A pair of the adjacent first pins are a pair of network data pins, and each pair of network data pins are configured to transmit a pair of network data differential signals. A pair of adjacent first pins refer to two adjacent first pins, and there is no pin between the two first pins. The second pins located on both sides of the network data pins include a standby control pin and four grounding pins, and two second pins surround/wrap a pair of first pins.

The network data pins are configured to transmit a network data signal. In this embodiment, the network data signal includes a total of four pairs of differential signals, which are respectively transmitted by four pairs of network data pins.

The standby control pin is configured to transmit a standby control signal when the network data pins transmit the network data signal. Thereinto, the standby control signal can be output by a display and sent to a host computer via the standby control pin of a connector, and the host computer enters or exits a standby state according to the standby control signal.

The grounding pin is configured to be grounded.

It should be noted that in the above embodiment, the positions of the standby control pin and the grounding pin can be interchanged, and the standby control pin can also be replaced by another second pin used to transmit a low-speed second signal, as long as a plurality of second pins are provided on both sides of a pair of first pins. They are not limited to the embodiments of the present disclosure.

Specifically, FIG. 4 is a schematic diagram of another pin layout provided by an embodiment of the present disclosure. As shown in FIG. 4, in this embodiment, the socket includes at least 15 pins, and the 15 pins are arranged in a column, which are numbered as Nos. 1-15 in sequence from top to bottom. Thereinto, Pin No. 2 is a second pin, specifically a standby control pin, which is configured to transmit a standby control signal (the second signal) when the network data pins transmit the network data signal (the first signal). Adjacent Pin Nos. 3 and 4 are first pins, specifically a pair of network data pins, which are configured to transmit a network data signal (first signal). Pin No. 5 is a second pin, which is configured to be grounded. Adjacent Pin Nos. 6 and 7 are first pins, specifically a pair of network data pins, which are configured to transmit a network data signal (the first signal). Pin No. 8 is a second pin, which is configured to be grounded. Adjacent Pin Nos. 9 and 10 are first pins, specifically a pair of network data pins, which are configured to transmit a network data signal (the first signal). Pin No. 11 is a second pin, which is configured to be grounded.

Adjacent Pin Nos. 12 and 13 are first pins, specifically a pair of network data pins, which are configured to transmit a network data signal (first signal). Pin No. 14 is a second pin, which is configured to be grounded. In this embodiment, Pin Nos. 1 and 15 can be removed or suspended.

In this embodiment, the standby control pin transmits a low-speed standby control signal when the network data pins transmit a high-speed network data signal. The standby control pin is multiplexed as a pin for isolating ground, which reduces the number of grounding pins used for grounding, and reduces production costs. A plurality of second pins are arranged on both sides of a pair of network data pins, and wrap the pair of network data pins to be grounded, so as to reduce the crosstalk between the first signals transmitted on two adjacent pairs of network data pins.

In some sockets, the first pins and the second pins can be adapted to the shape of the contact pins, arranged along one column or two or more columns. Two pairs of first pins are USB 2.0 pins. The second pins located on both sides of the USB 2.0 pins include a serial port data receiving pin and a power switch control pin. A pair of adjacent first pins are a pair of USB 2.0 pins, and a pair of USB 2.0 pins are configured to transmit a pair of USB 2.0 differential signals. A pair of adjacent first pins refer to two adjacent first pins, and there is no pin between the two first pins.

The USB 2.0 pins are configured to transmit USB 2.0 data signals. In this embodiment, a USB 2.0 data signal includes two pairs of differential signals, which are respectively transmitted by two pairs of USB 2.0 pins.

The serial port data receiving pin is configured to transmit serial port data signal when the USB 2.0 pin transmits the USB 2.0 data signal.

The power switch control pin is configured to transmit a power switch control signal when the USB 2.0 pins transmit USB 2.0 data signals. Thereinto, the power switch control signal can be output by a display and sent to a computer host via the power switch control pin of a connector, and the computer host is turned on or off according to the power switch control signal.

It should be noted that in the above embodiment, the positions of the serial port data receiving pin and the power switch control pin can be interchanged, and the serial port data receiving pin and the power switch control pin can also be replaced by another second pin used for transmitting a low-speed second signal, as long as a plurality of second pins are arranged on both sides of a pair of first pins, which is not limited to the embodiments of the present disclosure herein.

Specifically, FIG. 5 is a schematic diagram of another pin layout provided by an embodiment of the present disclosure. Specifically, as shown in FIG. 5, the socket includes at least 7 pins, and the 7 pins are arranged in a column, which are numbered as Nos. 1-7 in sequence from top to bottom. Thereinto, Pin No. 1 is a second pin, which is configured to be grounded. Adjacent Pin Nos. 2 and pin 3 are first pins, specifically a pair of USB 2.0 pins, which are configured to transmit a USB 2.0 data signal (first signal). Pin No. 4 is a second pin, specifically the power switch control pin, which is configured to transmit a power switch control signal when the USB 2.0 pins transmit the USB 2.0 data signal (the first signal). Adjacent Pin Nos. 5 and 6 are first pins, specifically a pair of USB 2.0 pins, which are configured to transmit a USB 2.0 data signal (first signal). Pin No. 7 is a second pin, specifically a serial port data receiving pin, which is configured to transmit serial port data (second signal) when the USB 2.0 pins transmit a differential signal of USB 2.0 data signals.

In this embodiment, when the power switch control pin transmits a low-speed power switch control signal when the USB 2.0 pins transmit a high-speed USB 2.0 data signal. The power switch control pin is multiplexed as a pin for isolating ground, which reduces the number of grounding pins used for grounding, and reduces production costs. A plurality of second pins is arranged on both sides of a pair of USB 2.0 pins, and wrap the pair of USB 2.0 pins to be grounded, so as to reduce crosstalk between the first signals transmitted on two adjacent pairs of USB 2.0 pins.

FIG. 6 is a schematic diagram of another pin layout provided by an embodiment of the present disclosure. Specifically, as shown in FIG. 6, there are a total of 40 first pins and second pins, and the 40 pins are symmetrically arranged on both sides of the socket. The first pin includes four pairs of HDMI pins, two pairs of USB 3.0 pins, two pairs of USB 2.0 pins, four pairs of network data pins, and two DDC pins, which are a DDC clock pin and a DDC data pin respectively.

The second pins include an HDMI power pin, a hot plug detection pin, a serial port data sending pin, a serial port data receiving pin, a standby control pin, a power switch control pin, and eight grounding pins.

There are 20 pins on the first side of the socket. The 20 pins are arranged in a column and numbered as Nos. 1-20 in sequence, which are sequentially one DDC clock pin, an HDMI power pin, a pair of HDMI pins, a grounding pin, a pair of HDMI pins, a grounding pin, a pair of HDMI pins, a grounding pin, a pair of HDMI pins, a hot plug detection pin, a pair of USB 3.0 pins, a grounding pin, a pair of USB3.0 pins, and a serial port data sending pin.

There are 20 pins on the second side of the socket. The 20 pins are arranged in a column and numbered as Nos. 21-40 in sequence, which are sequentially one DDC data pin, a standby control pin, a pair of network data pins, a grounding pin, a pair of network data pins, a grounding pin, a pair of network data pins, a grounding pin, a pair of network data pins, a grounding pin, a pair of USB2.0 pins, a power switch control pin, a pair of USB2.0 pins, and a serial port data receiving pin.

Specifically, the HDMI power pin is configured to transmit an HDMI power signal when the HDMI pins transmit HDMI video signals. The hot plug detection pin is configured to transmit a hot plug detection signal when the HDMI pins transmit HDMI video signals. The serial port data sending pin is configured to transmit serial port data when the USB 3.0 pins transmit USB 3.0 data signals. The standby control pin is configured to transmit a standby control signal when the network data pins transmit a network data signal. The power switch control pin is configured to transmit a power switch control signal when the USB 2.0 pins transmit USB 2.0 data signals. The serial port data receiving pin is configured to transmit serial port data when the USB 2.0 pins transmit the USB 2.0 data signals.

As shown in FIG. 6, the socket further includes two main power pins and two main power grounding pins. The main power pins are configured to receive a main power signal from a display to drive a computer host for work. The two main power grounding pins are configured to be grounded.

In this embodiment, when the first pins transmit high-speed first signals, the HDMI power pin, hot plug detection pin, serial port data sending pin, standby control pin, power switch control pin, and serial port data receiving pin transmit low-speed second signals. The HDMI power pin, hot plug detection pin, serial port data sending pin, standby control pin, power switch control pin, and serial port data receiving pin are multiplexed as pins for isolating ground, which reduce the number of grounding pins used for grounding, and reduce production costs. A plurality of second pins are arranged on both sides of a pair of first pins, and wrap the pair of first pins to be grounded, so as to avoid crosstalk between the first signals transmitted on two adjacent pairs of first pins.

FIG. 7 is a schematic structure diagram of a circuit board provided by an embodiment of the present disclosure. As shown in FIG. 7, the connector further includes a circuit board 120, and a socket 110 is welded on one of the edges of the circuit board 120. A first surface of the circuit board 120 is divided into a first wire region AA and a second wire region BB, and the distance between the first wire region AA and the edge (socket 110) of the circuit board is greater than that between the second wire region BB and the edge (socket 110) of the circuit board.

The first wire region AA is arranged with first welding spots 101, second welding spots 102, first wires 121, and second wires 122. The first welding spots 101 are electrically connected with the first wires 121, and the second welding spots 102 are electrically connected with the second wires 122.

Exemplarily, the first welding spots 101 and the second welding spots 102 are adapted to the arrangement mode of the first pins and the second pins in the socket 110, and are arranged along one column or two or more columns. The second welding spots 102 are respectively located on both sides of a pair of adjacent first welding spots 101. A pair of adjacent first welding spots 101 refer to two adjacent first welding spots 101, and there is no other welding spot between the two first welding spots 101.

The second wires 122 are respectively located on both sides of a pair of adjacent first wires 121, that is, one side of the pair of first wires 121 is a second wire 122, and the other side of the pair of first wires 121 is another second wire 122, so that two second wires 122 surround/wrap the pair of first wires 121. A pair of adjacent first wires 121 refer to two adjacent first wires 121, and there are no other wires between the two first wires 121.

The first welding spot 101 is configured to weld the first pin in the socket 110, and the second welding spot 102 is configured to weld the second pin in the socket, that is, a pair of adjacent first wires 121 are configured to transmit the first signal, and the second wires 122 is configured to be grounded or transmit the second signal.

In order to reduce the problem of crosstalk between high-speed signal lines, it is usually necessary to arrange a grounding wire in parallel on both sides of a pair of wires that transmit differential signals, called a wrapping grounding wire. After the wrapping grounding wire is inserted, signals of two adjacent pairs of differential signal wires are coupled with the ground, and the two pairs of differential signal wires are no longer coupled with each other, so that the crosstalk between the wires is greatly reduced. In the embodiment of the present disclosure, the second wire transmits a low-speed second signal when the first wire transmits a high-speed first signal (differential signal). Since the low speed signal plays a role of grounding relative to the high-speed signal, the second wire used for transmitting the low-speed second signal also plays a role of isolating ground while transmitting the second signal, and is multiplexed as an isolation grounding wire, thereby reducing the number of grounding wires used for grounding. The second wires are arranged on both sides of a pair of first wires, and wrap the pair of first wires to be grounded, so as to reduce the crosstalk between the differential signals transmitted on two adjacent pairs of first wires.

Exemplarily, as shown in FIG. 7, the first welding spots 101 and the second welding spots 102 in the first wire region AA may be arranged in a column, and the second wire region BB is provided with another column of welding spots symmetrical with the column of welding spots in the first wire region AA. As shown in FIG. 7, the second wire region BB is arranged with third welding spots 103, fourth welding spots 104, third wires 123, and fourth wires 124.

Exemplarily, the third welding spots 103 and the fourth welding spots 104 in the second wire region BB may be arranged in a column, and the fourth welding spots 104 in the second wire region BB are respectively located on both sides of a pair of adjacent third welding spots 103. A pair of adjacent third welding spots 103 refer to two adjacent third welding spots 103, and there is no other welding spot between the two third welding spots 103.

The third welding spots 103 are electrically connected with the third wires 123, and at least one fourth welding spot 104 is electrically connected with a grounding welding pad on the second surface of the circuit board 120 through a via hole penetrating the circuit board 120. The second surface is a surface opposite to the first surface. The remaining fourth welding spots 104 are electrically connected with the fourth wires 124.

A pair of adjacent third wires 123 are configured to transmit a first signal (differential signal). The fourth wires 124 are configured to be grounded, or when the third wires 123 transmit a differential signal, transmit the second signal. The transmission rate of the differential signal is greater than that of the second signal. A pair of adjacent third wires 123 refer to two adjacent third wires 123, and there are no other wires between the two third wires 123. Correspondingly, two columns of pins are provided in the socket, and each pin in the first column of the two columns of pins is welded to the corresponding welding spot in the first wire region AA, and each pin in the second column of the two columns of pins is welded on the corresponding welding spot in the second wire region BB.

As shown in FIG. 7, since the second wire region BB is close to the socket 110, the width of the second wire region BB depends on the distance between the two columns of welding spots, that is, the distance between the two columns of pins of the socket 110. Usually, a distance between the two columns of pins of the socket 110 is small, about 4-5mm, which results in insufficient space for wiring in the second wire region BB. Therefore, in the second wire region BB, there is no fourth wire 124 wrapping to be grounded on both sides of the pair of third wires 123 used for transmitting differential signals, or one side of the pair of third wires 123 is provided with a fourth wire 124 wrapping to be grounded. However, the first wire region AA far away from the socket 110 has sufficient wiring space, therefore, second wires 122 can be provided on both sides of a pair of adjacent first wires 121 to reduce coupling between two adjacent pairs of first wires, thereby reducing crosstalk.

A core function of the above-mentioned connector is to ensure that audio and video signals can be normally transmitted between the computer host and the display, that is, to ensure the reliability of HDMI video signal. Therefore, the four pairs of first wires 121 used for HDMI transmission are arranged in the first wire region AA. Since the first wire region AA has sufficient wiring space, it is possible to ensure that second wires 122 can be provided on both sides of each pair of first wires 121 used for transmitting HDMI video signals, so as to reduce the coupling between the two pairs of adjacent HDMI video signal wires, thereby reducing crosstalk and ensuring the integrity of HDMI video signals.

Figure 8:
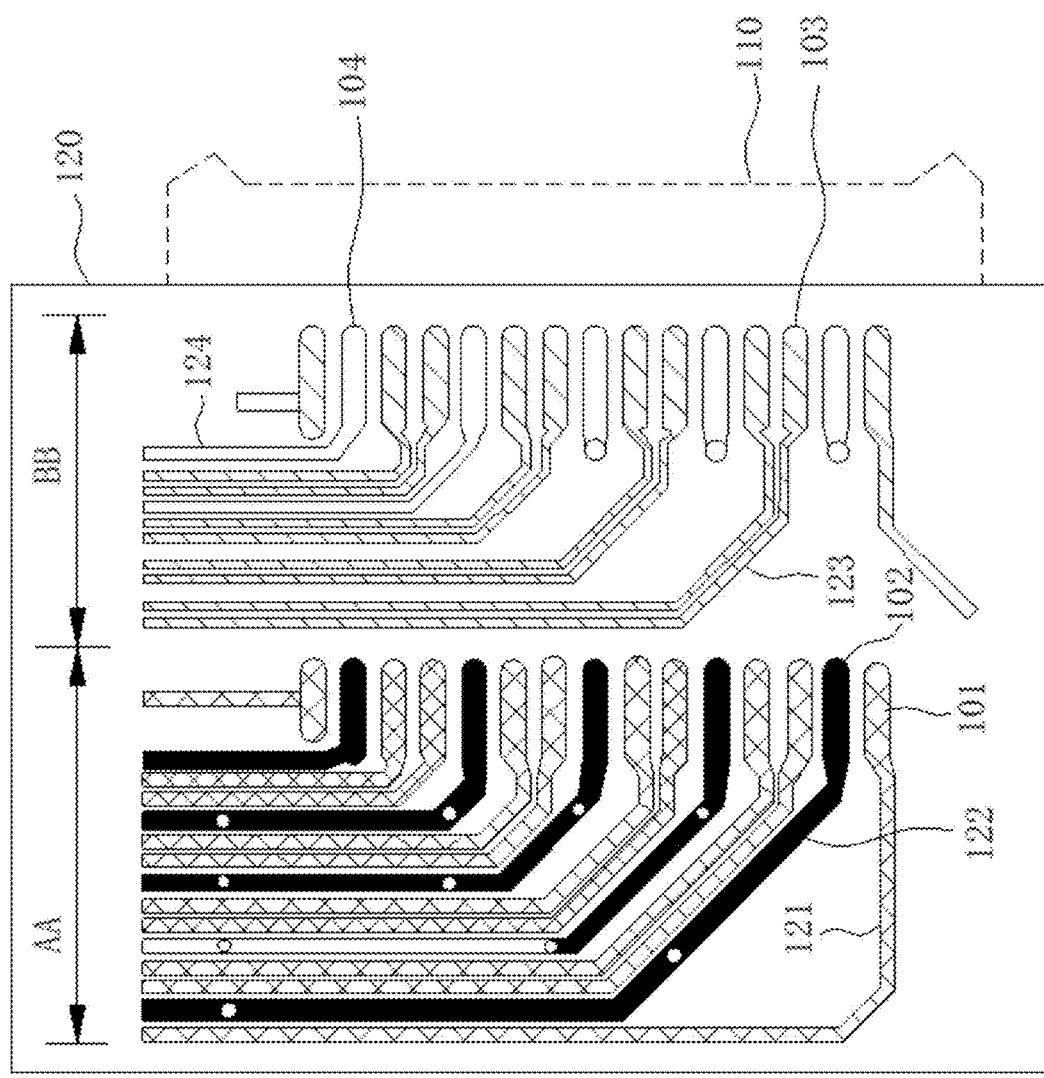
FIG. 8 is a schematic structure diagram of another circuit board provided by embodiments of the present disclosure.

Specifically, FIG. 8 is a schematic structure diagram of another circuit board provided by an embodiment of the present disclosure. As shown in FIG. 8, in the first wire region AA of the circuit board 120, four pairs of first wires 121 are HDMI wires, and the second wires 122 include an HDMI power wire, three grounding wires, and a hot plug detection wire. The four pairs of first welding spots 101 are HDMI welding spots, and the second welding spots 102 include an HDMI power welding spot, three grounding welding spots, and a hot plug detection welding spot.

The first wire 121 further includes two DDC wires, and the DDC wires are configured to transmit DDC signals.

A column of welding spots in the first wire region AA are respectively: a DDC clock welding spot, wherein a DDC clock wire is electrically connected with the DDC clock welding spot for transmitting a DDC clock signal; an HDMI power welding spot, wherein an HDMI power wire is electrically connected with the HDMI power welding spot for transmitting an HDMI power signal when the HDMI wire transmits an HDMI video signal; a pair of HDMI welding spots that are electrically connected with a pair of HDMI wires; a grounding welding spot that is electrically connected with a grounding wire; a pair of HDMI welding spots that are electrically connected with a pair of HDMI wires; a grounding welding spot that is electrically connected with a grounding wire; a pair of HDMI welding spots that are electrically connected with a pair of HDMI wires; a grounding welding spots that is electrically connected with a grounding wire; a pair of HDMI welding spots that are electrically connected with a pair of HDMI wires; a hot plug detection welding spot that is electrically connected with a hot plug detection wire; and a DDC data welding spot, wherein a DDC data wire is electrically connected with the DDC data welding spot for transmitting a DDC data signal.

The HDMI welding spot is configured to weld an HDMI pin, and the HDMI wire is electrically connected with the HDMI welding spot for transmitting an HDMI video signal. In this embodiment, the HDMI video signal includes a total of four pairs of differential signals, which are an HDMI clock signal, a red video signal, a green video signal, and a blue video signal, and they are respectively transmitted by four pairs of HDMI wires.

The HDMI power welding spot is configured to weld an HDMI power pin.

The grounding welding spot is configured to weld a grounding pin, and the grounding wire is electrically connected with the grounding welding spot for grounding.

The hot plug detection welding spot is configured to weld the hot plug detection pin, and the hot plug detection wire is electrically connected with the hot plug detection welding spot, and is configured to transmit the hot plug detection signal when the HDMI wire transmits the HDMI video signal.

As shown in FIG. 8, in the second wire region BB of the circuit board 120, four pairs of third wires 123 are network data wires, and the fourth wires 124 include a standby control wire and four grounding wires. The four pairs of third welding spots 103 are network data welding spots, and the fourth welding spots 104 include a standby control welding spot and four grounding welding spots.

A column of welding spots in the second wire region BB are respectively: a floating welding spot that is not connected with wires; a standby control welding spot, wherein a standby control wire is electrically connected with the standby control welding spot for transmitting a standby control signal when the network data wire transmits a network data signal; a pair of network data welding spots, wherein a pair of network data wires is electrically connected with the pair of network data welding spots; a grounding welding spot that is electrically connected with a grounding wire; a pair of network data welding spots that are electrically connected with a pair of network data wires; a grounding welding spot that is electrically connected with a grounding wire; a pair of network data welding spots that are electrically connected with a pair of network data wires; a grounding welding spot that is electrically connected with a grounding wire; a pair of network data welding spots that is electrically connected with a pair of network data wires; a grounding welding spot that is electrically connected with a grounding wire; and a floating welding spot that is not connected with wires.

The network data welding spot is configured to weld a network data pin, and the network data wire is electrically connected with the network data welding spot for transmitting a network data signal. In this embodiment, the network data signal includes a total of four pairs of differential signals, which are respectively transmitted by four pairs of network data wires.

The standby control welding spot is configured to weld a standby control pin, and the standby control wire is electrically connected with the standby control welding spot, and is configured to transmit a standby control signal when the network data pins transmit the network data signal.

The grounding welding spot is configured to weld a grounding pin, and the grounding wire is electrically connected with the grounding welding spot for grounding.

FIG. 9 is a schematic diagram of a pin layout of a socket corresponding to the circuit board of FIG. 8. As shown in FIG. 9, the first column of pins of the socket includes at least 15 pins. The 15 pins are arranged in a column, which are numbered as Nos. 1-15 in sequence from top to bottom. Thereinto, Pin No. 1 is a first pin, specifically a DDC clock pin. Pin No. 2 is a second pin, specifically an HDMI power pin. Adjacent Pin Nos. 3 and 4 are first pins, specifically a pair of HDMI pins. Pin No. 5 is a second pin, specifically a grounding pin. Adjacent Pin Nos. 6 and 7 are first pins, specifically a pair of HDMI pins. Pin No. 8 is a second pin, specifically a grounding pin. Adjacent Pin Nos. 9 and 10 are first pins, specifically a pair of HDMI pins. Pin No. 11 is a second pin, specifically a grounding pin. Adjacent Pin Nos. 12 and 13 are first pins, specifically a pair of HDMI pins. Pin No. 14 is a second pin, specifically a hot plug detection pin. Pin No. 15 is a first pin, specifically a DDC data pin. Pin Nos. 1-15 pins are respectively welded on 15 welding spots from top to bottom in the first wire region AA.

It should be noted that in the above-mentioned embodiment, the positions of the HDMI power wire, the three grounding wires, and the hot plug detection wire can be interchanged, and the HDMI power wire and the hot plug detection wire can also be replaced by another second wire used for transmitting a low-speed second signal, as long as the second wires are arranged on both sides of a pair of first wires. They are not limited to the embodiments of the present disclosure.

As shown in FIG. 9, the second column of pins of the socket includes at least 15 pins, and the 15 pins are arranged in a column, which are numbered as Nos. 16-30 in sequence from top to bottom. Thereinto, Pin No. 17 is a second pin, specifically a standby control pin. Adjacent Pin Nos. 18 and 19 are first pins, specifically a pair of network data pins. Pin No. 20 is a second pin, specifically a grounding pin. Adjacent Pin Nos. 21 and 22 are first pins, specifically a pair of network data pins. Pin No. 23 is a second pin, specifically a grounding pin. Adjacent Pin Nos. 24 and 25 are first pins, specifically a pair of network data pins. Pin No. 26 is a second pin, specifically a grounding pin. Adjacent Pin Nos. 27 and 28 are first pins, specifically a pair of network data pins. Pin No. 29 is a second pin, specifically a grounding pin. In this embodiment, Pin Nos. 16 and 30 can be removed or suspended. Pin Nos. 16-30 pins are respectively welded on 15 welding spots from top to bottom in the second wire region BB.

It should be noted that in the above embodiment, the positions of the standby control welding spot and the grounding welding spot can be interchanged, and the standby control welding spot can also be replaced by another fourth welding spot for transmitting a low-speed second signal, as long as the fourth welding spots are arranged on both sides of a pair of third welding spots. They are not limited to the embodiments of the present disclosure.

Figure 10:
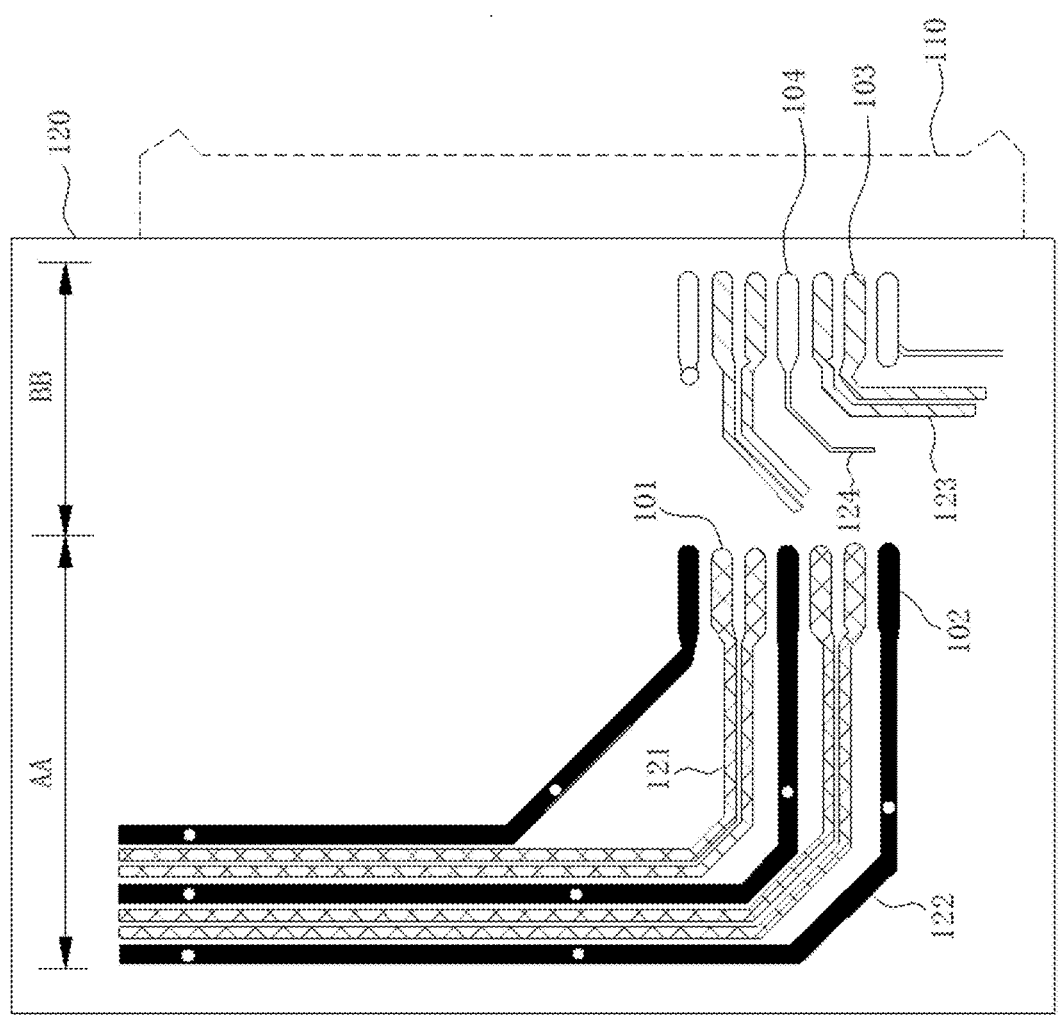
FIG. 10 is a schematic structure diagram of another circuit board provided by embodiments of the present disclosure.

FIG. 10 is a schematic structure diagram of another circuit board provided by an embodiment of the present disclosure. As shown in FIG. 10, in some embodiments, in the first wire region AA of the circuit board 120, two pairs of first wires 121 are USB 3.0 wires, and the second wires 122 include a serial port data sending wire and a grounding wire. The two pairs of first welding spots 101 are USB 3.0 welding spots, and the second welding spots 102 include a serial port data sending welding spot and a grounding welding spot.

Specifically, a column of welding spots in the first wire region AA are respectively a grounding welding spot that is electrically connected with a grounding wire, a pair of USB 3.0 welding spots that are electrically connected with a pair of USB 3.0 wires, a pair of USB 3.0 welding spots that are electrically connected with a pair of USB 3.0 wires, a grounding wire that is electrically connected with a grounding wire, a pair of USB 3.0 welding spots that are electrically connected with a pair of USB 3.0 wires, and a serial port data sending welding spot that is electrically connected with a serial port data sending wire.

The USB 3.0 welding spots are configured to weld the USB 3.0 pins, and the USB 3.0 wires are electrically connected with the USB 3.0 welding spots. A pair of adjacent first wires 121 are USB 3.0 wires, and the USB 3.0 wires are configured to transmit USB 3.0 data signals. In this embodiment, the USB 3.0 data signals include a total of two pairs of differential signals, which are respectively transmitted by two pairs of USB 3.0 wires. A pair of adjacent first wires 121 refer to two adjacent first wires 121, and there are no other wires between the two first wires 121.

The grounding welding spot is configured to weld the grounding pin, and the grounding wire is electrically connected with the grounding welding spot for grounding.

The serial port data sending welding spot is configured to weld the serial port data sending pin, the serial port data sending wire is electrically connected with the serial port data sending welding spot, and the serial port data sending wire is configured to transmit a serial port data signal when the USB 3.0 wires transmit USB 3.0 data signals.

In some embodiments, as shown in FIG. 10, in the second wire region BB of the circuit board 120, the two pairs of third wires 123 are USB 2.0 wires, and the fourth wires 124 include a power switch wire and a serial port data receiving wire. The two pairs of third welding spots 103 are USB 2.0 welding spots, and the fourth welding spots 104 include a power switch welding spot and a serial port data receiving welding spot.

Specifically, a column of welding spots in the second wire region BB are respectively a grounding welding spot that is electrically connected with a grounding welding pad on the second surface of the circuit board 120 through a via hole penetrating the circuit board 120, a pair of USB 2.0 welding spots that are electrically connected with a pair of USB 2.0 wires, a power switch welding spot that is electrically connected with a power switch wire, a pair of USB 2.0 welding spots that are electrically connected with a pair of USB 2.0 wires, and a serial port data receiving welding spot that is electrically connected with a serial port data receiving wire.

The USB 2.0 welding spots are configured to weld USB 2.0 pins. The USB 2.0 wires are electrically connected with the USB 2.0 welding spots. A pair of adjacent third wires 123 are USB 2.0 wires, and the USB 2.0 wires are configured to transmit USB 2.0 data signals. In this embodiment, the USB 2.0 data signals include two pairs of differential signals, which are respectively transmitted by two pairs of USB 2.0 wires. A pair of adjacent third wires 123 refer to two adjacent third wires 123, and there are no other wires between the two third wires 123.

The grounding welding spot is configured to weld the grounding pin, and the grounding wire is electrically connected with the grounding welding spot for grounding.

The serial port data receiving welding spot is configured to weld the serial port data receiving pin, the serial port data receiving wire is electrically connected with the serial port data receiving welding spot, and the serial port data receiving wire is configured to receive the serial port data signal when the USB 2.0 wires transmit USB 2.0 data signals.

The power switch welding spot is configured to weld a power switch pin, and the power switch wire is electrically connected with the power switch welding spot for transmitting a power switch control signal when the USB 2.0 wires transmit USB 2.0 data signals.

FIG. 11 is a schematic diagram of a pin layout of a socket corresponding to the circuit board of FIG. 10. As shown in FIG. 11, the first column of pins of the socket includes at least 7 pins, and the 7 pins are arranged in a column, which are numbered as Nos. 1-7 in sequence from top to bottom. Thereinto, Pin No. 1 is a second pin, specifically a grounding pin. Adjacent Pin Nos. 2 and 3 are first pins, specifically a pair of USB 3.0 pins. Pin No. 4 is a second pin, specifically a grounding pin. Adjacent Pin Nos. 5 and 6 are first pins, specifically a pair of USB 3.0 pins. Pin No. 7 is a second pin, specifically a serial port data transmitting pin. Pin Nos. 1-7 are respectively welded on the 7 welding spots from top to bottom in the first wire region AA.

It should be noted that in the above embodiment, the positions of the serial port data sending wire and the grounding wire can be interchanged, and the serial port data sending wire can also be replaced by another second wire used for transmitting the low-speed second signal, as long as the second wires are arranged on both sides of a pair of first wires. This is not limited to the embodiments of the present disclosure.

As shown in FIG. 11, the second column of pins of the socket includes at least 7 pins, and the 7 pins are arranged in a column, which are numbered as Nos. 8-14 in sequence from top to bottom. Thereinto, Pin No. 8 is a fourth pin, specifically a grounding pin. Adjacent Pin Nos. 9 and 10 are third pins, specifically a pair of USB 2.0 pins. Pin No. 11 is a fourth pin, specifically a power switch control pin. Adjacent Pin Nos. 12 and 13 are third pins, specifically a pair of USB 2.0 pins. Pin No. 14 is a fourth pin, specifically a serial port data receiving pin. Pin Nos. 8-14 pins are respectively welded on the 7 welding spots from top to bottom in the second wire region BB.

It should be noted that in the above embodiment, the positions of the power switch welding spot, serial port data receiving welding spot, and grounding welding spot can be interchanged, and the power switch welding spot and serial port data receiving welding spot can also be replaced by another second wire used for transmitting the low-speed second signal, as long as the fourth welding spot are arranged on both sides of a pair of third welding spots. This is not limited to the embodiments of the present disclosure.

Figure 12:
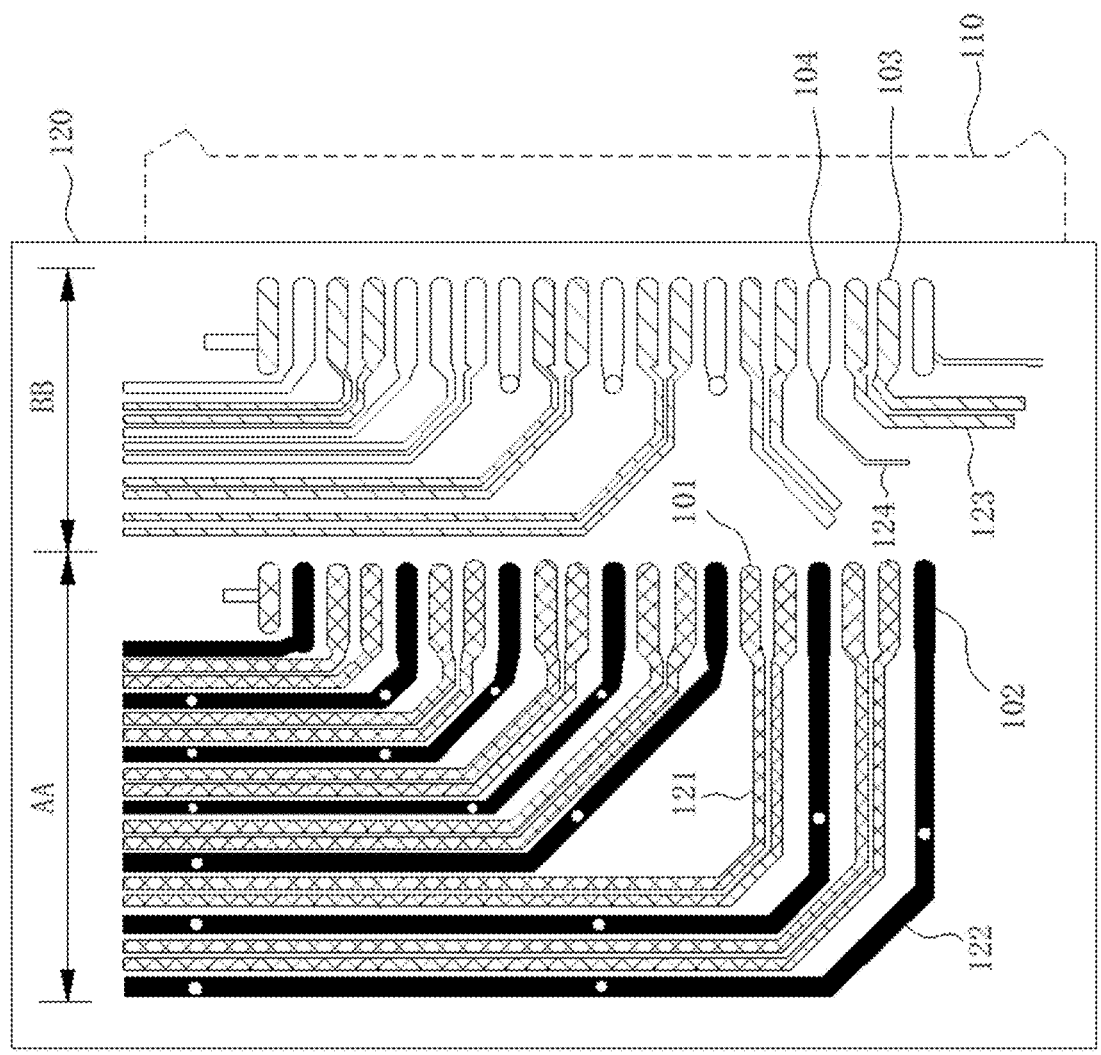
FIG. 12 is a schematic structure diagram of another circuit board provided by embodiments of the present disclosure.

FIG. 12 is a schematic structure diagram of another circuit board provided by an embodiment of the present disclosure. For the schematic diagram of the pin layout of the socket corresponding to the circuit board, reference is made to FIG. 6. As shown in FIG. 12, the first wire region AA includes 20 welding spots, which are respectively from top to bottom a DDC clock welding spot, an HDMI power welding spot, a pair of HDMI welding spots, a grounding welding spot, a pair of HDMI welding spots, a grounding welding spot, a pair of HDMI welding spots, a grounding welding spot, a pair of HDMI welding spots, a hot plug detection welding spot, a pair of USB 3.0 welding spots, a grounding welding spot, a pair of USB 3.0 welding spots, and a serial port data sending welding spot.

The first wires 121 include a DDC clock wire, four pairs of HDMI wires, and two pairs of USB 3.0 wires. The second wires 122 include an HDMI power wire, four grounding wires, a hot plug detection wire, and a serial port data sending wire. The DDC clock welding spot is electrically connected with the DDC clock wire, the HDMI power welding spot is electrically connected with the HDMI power wire, the HDMI welding spot is electrically connected with the HDMI wire, the hot plug detection welding spot is electrically connected with the hot plug detection wire, the grounding welding spot is electrically connected with the grounding wire, the USB 3.0 welding spot is electrically connected with the USB 3.0 wire, and the serial port data sending welding spot is electrically connected with the serial port data sending wire.

The second wire region BB includes 20 welding spots, which are respectively from top to bottom a DDC data welding spot, a standby control welding spot, a pair of network data welding spots, a grounding welding spot, a pair of network data welding spots, a grounding welding spot, a pair of network data welding spots, a grounding welding spot, a pair of network data welding spots, a grounding welding spot, a pair of USB 2.0 welding spots, a power switch welding spot, a pair of USB 2.0 welding spots, and a serial port data receiving welding spot.

The third wires 123 include a DDC data wire, four pairs of network data wires, and two pairs of USB2.0 wires. The fourth wires 124 include a standby control wire, a power switch wire, a serial port data receiving wire, and a grounding wire. The DDC data welding spot is electrically connected with the DDC data wire, the standby control welding spot is electrically connected with the standby control wire, the network data welding spot is electrically connected with the network data wire, the grounding welding spot located between two pairs of network data wires is electrically connected with a grounding welding pad on the second surface of the circuit board through a via hole penetrating the circuit board, the USB 2.0 welding spot is electrically connected with the USB 2.0 wire, the power switch welding spot is electrically connected with the power switch wire, and the serial port data receiving welding spot is electrically connected with the serial port data receiving wire.

As shown in FIG. 6, the socket includes two columns of pins. The first column of pins includes 20 pins, which are respectively from top to bottom a DDC clock pin, an HDMI power pin, a pair of HDMI pins, a grounding pin, a pair of HDMI pins, a grounding pin, a pair of HDMI pins, a grounding pin, a pair of HDMI pins, a hot plug detection pin, a pair of USB 3.0 pins, a grounding pin, a pair of USB3.0 pins, and a serial port data sending pin. The DDC clock welding spot is configured to weld the DDC clock pin, the HDMI power welding spot is configured to weld the HDMI power pin, the HDMI welding spots are configured to weld the HDMI pins, the grounding welding spots are configured to weld the grounding pins, the hot plug detection welding spot is configured to weld the hot plug detection pin, the USB 3.0 welding spots are configured to weld the USB 3.0 pins, and the serial port data sending welding spot is configured to weld the serial port data sending pin.

The second column of pins includes 20 pins, which are respectively from top to bottom a DDC data pin, a standby control pin, a pair of network data pins, a grounding pin, a pair of network data pins, a grounding pin, a pair of network data pins, a grounding pin, a pair of network data pins, a grounding pin, a pair of USB 2.0 pins, a power switch pin, a pair of USB 2.0 pins, and a serial port data receiving pin. The DDC data welding spot is configured to weld the DDC data pin, the standby control welding spot is configured to weld the standby control pin, the network data welding spots are configured to weld the network data pins, the grounding welding spots are configured to weld the grounding pins, and the power switch welding spot is configured to weld the power switch pin, the USB 2.0 welding spots are configured to weld the USB 2.0 pins, and the serial port data receiving welding spot is configured to weld the serial port data receiving pins.

In some connectors, the second surface of the circuit board 120 is provided with a grounding welding pad. In the first wire region AA, the second wire 122 for grounding and the grounding wire and grounding welding spots in the second wire region are electrically connected with the grounding welding pad through a via hole penetrating the circuit board 120, the second surface is a surface opposite to the first surface, and the grounding welding pad is configured to be grounded.

In some connectors, a plurality of via holes are provided on the second wire 122 used for grounding. On the same second wire 122, a hole spacing of two adjacent via holes is smaller than ⅕ wavelength of the differential signal transmitted on the first wire 121, so as to reduce a potential difference on the second wire 122, so that the potential of each position on the second wire 122 is ground potential.

Optionally, a line width of the second wire 122 is more than twice a line width of the first wire 121, which further reduces the coupling between the two adjacent pairs of the first wires 121 and reduces crosstalk.

Figure 13:
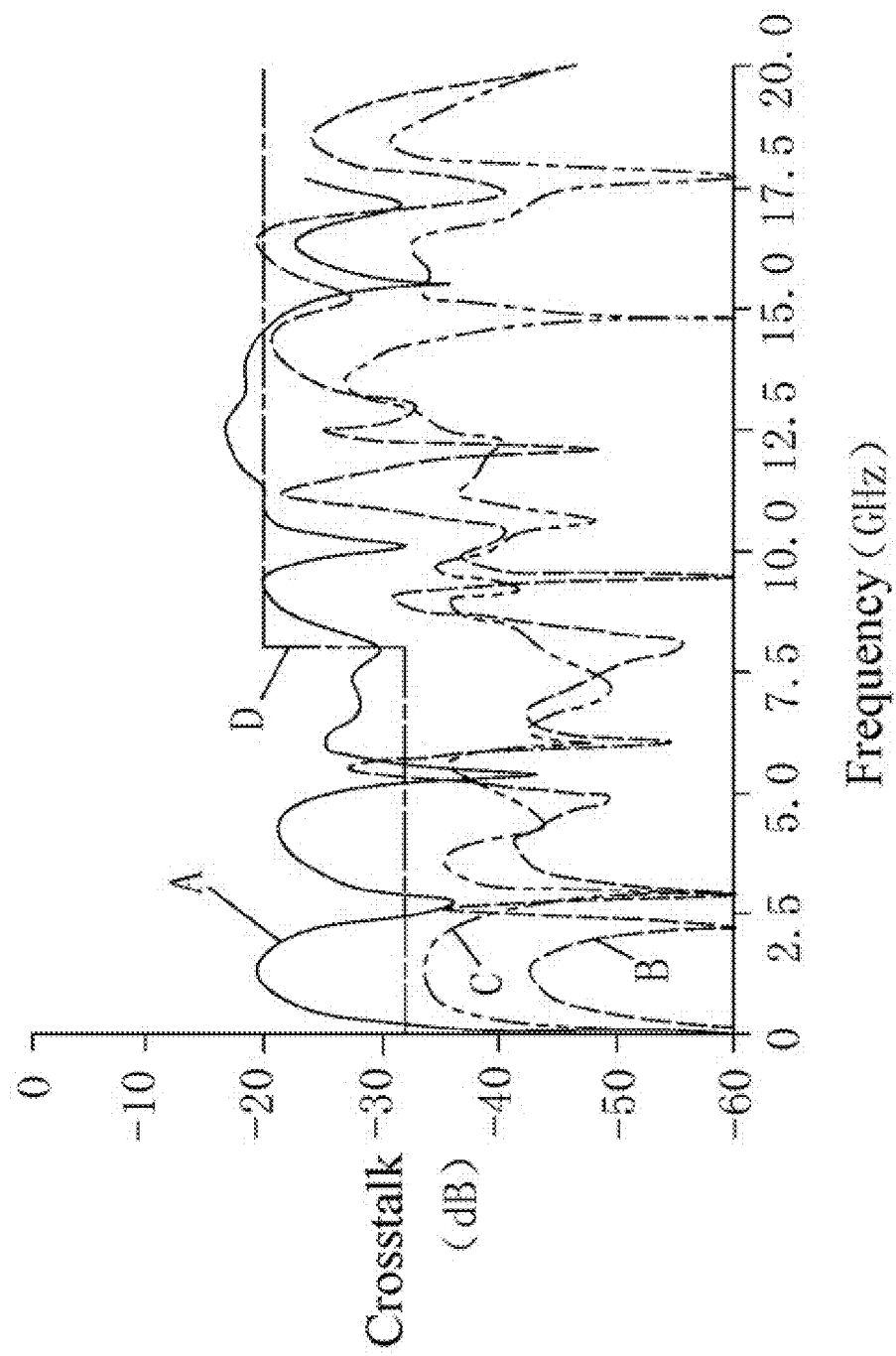
FIG. 13 is a diagram of a simulation result of near-end crosstalk of a first column of pins provided by embodiments of the present disclosure.
Figure 14:
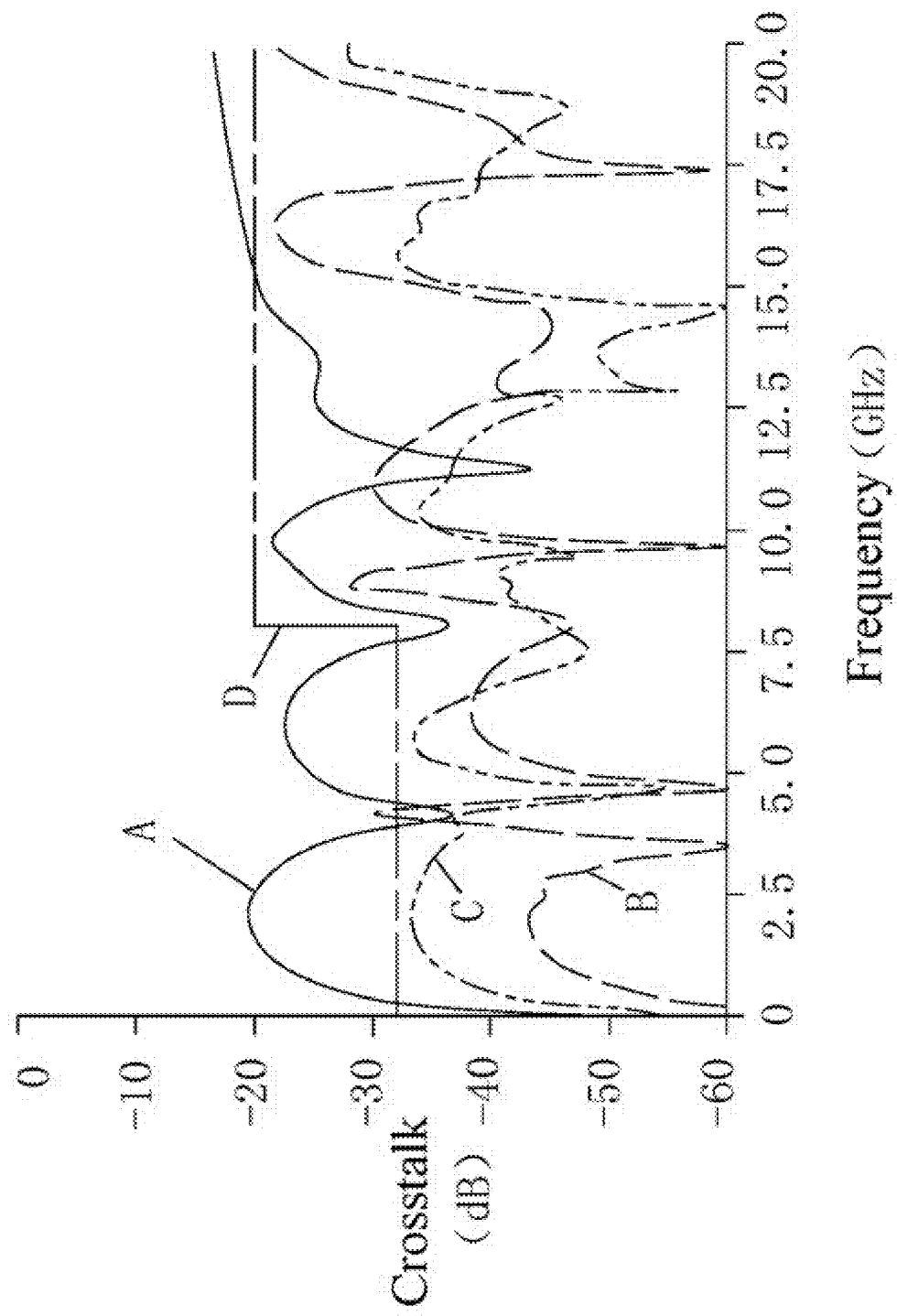
FIG. 14 is a diagram of a simulation result of near-end crosstalk of a second column of pins provided by embodiments of the present disclosure.

FIG. 13 is a diagram of a simulation result of near-end crosstalk of a first column of pins provided by an embodiment of the present disclosure, corresponding to a simulation result of near-end crosstalk of the first column (Pin Nos. 1-20) in FIG. 6 of the present disclosure. FIG. 14 is a diagram of a simulation result of near-end crosstalk of a second column of pins provided by an embodiment of the present disclosure, corresponding to a simulation result of near-end crosstalk of the second column (Pin Nos. 21-40) in FIG. 6 of the present disclosure. As shown in FIGS. 13 and 14, curve A is a near-end crosstalk curve when no second pin is arranged between two adjacent pairs of first pins, as shown by the solid line in the figure, curve B is a near-end crosstalk curve when the second pin for grounding is arranged between two pairs of first pins, as shown by the dotted line in the figure, curve C is a near-end crosstalk curve when the second pin for transmitting the second signal is arranged between two pairs of adjacent first pins, as shown by the double-dotted line in the figure, and curve D is a near-end crosstalk curve that meets the PCIE 4.0 standard, as shown by the dotted line in the figure. Thereinto, near-end crosstalk (NEXT) refers to the useless signal transmitted from a pair of first pins to another adjacent pair of first pins, and is a performance parameter that measures a single link/channel. NEXT is expressed in decibels (dB) and varies with transmission frequency. Higher frequencies cause greater interference. PCIE (Peripheral Component Interconnect Express) is a fast peripheral interconnection standard, and is an internal wiring standard of PC platforms released by Intel.

As shown in FIGS. 13 and 14, the near-end crosstalk can meet the PCIE 4.0 standard when the second pin for transmitting the second signal is arranged between two adjacent pairs of first pins, and the solution in which the second pin for transmitting the second signal is arranged between two pairs of first pins performs even better in the high frequency part than that in which the second pin for grounding is arranged between two adjacent pairs of first pins.

Embodiment 2

Figure 15:
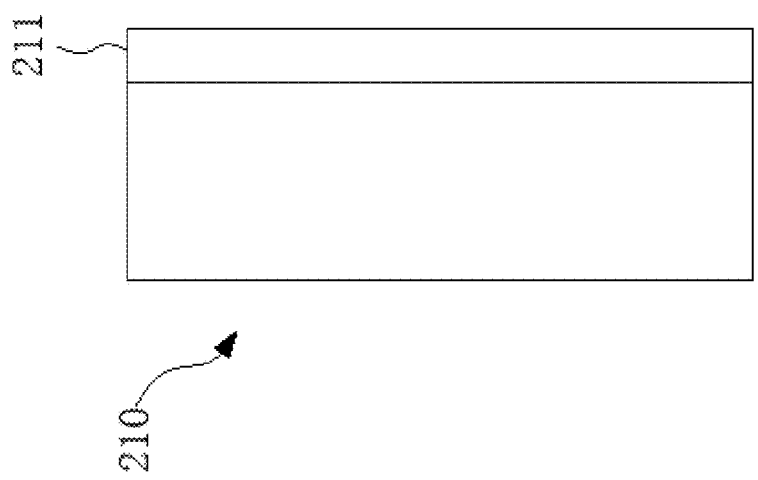
FIG. 15 is a schematic structure diagram of an electronic device provided by embodiments of the present disclosure.

An embodiment of the present disclosure further provides an electronic device, including a connector as provided in the above-mentioned embodiment of the present disclosure. FIG. 15 is a schematic structure diagram of an electronic device provided by an embodiment of the present disclosure. As shown in FIG. 15, an electronic device 210 includes a connector 211, the connector 211 includes a socket, and the socket includes a plurality of first pins and a plurality of second pins, a pair of adjacent first pins are configured to transmit a first signal, the second pin is configured to be grounded or transmit a second signal, wherein a transmission rate of the first signal is greater than that of the second signal, and a plurality of the second pins are arranged on both sides of a pair of the first pins.

In some sockets, four pairs of first pins are HDMI pins, and the second pins located on both sides of the HDMI pins include an HDMI power pin, three grounding pins, and a hot plug detection pin, the HDMI pin is configured to transmit an HDMI video signal, the HDMI power pin is configured to transmit an HDMI power signal when the HDMI pin transmits the HDMI video signal, the grounding pin is configured to be grounded, and the hot plug detection pin is configured to transmit a hot plug detection signal when the HDMI pin transmits the HDMI video signal.

In some sockets, the first pins further include two DDC pins, and the DDC pins are configured to transmit DDC signals.

In some sockets, two pairs of the first pins are USB 3.0 pins, and the second pins located on both sides of the USB 3.0 pins include a serial port data sending pin and a grounding pin, the USB 3.0 pin is configured to transmit a USB 3.0 data signal, the grounding pin is configured to be grounded, and the serial port data sending pin is configured to transmit a serial port data signal.

In some sockets, four pairs of the first pins are network data pins, and the second pins located on both sides of the network data pins include a standby control pin and four grounding pins, the network data pins are configured to transmit network data signals, the standby control pin is configured to transmit a standby control signal when the network data pins transmit the network data signal, and the grounding pin is configured to be grounded.

In some sockets, two pairs of the first pins are USB 2.0 pins, and the second pins located on both sides of the USB 2.0 pins include a serial port data receiving pin and a power switch control pin, the USB 2.0 pins are configured to transmit USB 2.0 data signals, the serial port data receiving pin is configured to receive a serial port data signal when the USB 2.0 pins transmit the USB 2.0 data signals, and the power switch control pin is configured to transmit a power switch control signal when the USB 2.0 pins transmit the USB 2.0 data signals.

In some sockets, the first pins include four pairs of HDMI pins, two pairs of USB 3.0 pins, two pairs of USB 2.0 pins, four pairs of network data pins, and two DDC pins, which are a DDC clock pin and a DDC data pin, the second pins include an HDMI power pin, a hot plug detection pin, a serial port data sending pin, a serial port data receiving pin, a standby control pin, a power switch control pin, and eight grounding pins, a first side of the socket is arranged in sequence with one DDC clock pin, the HDMI power pin, a pair of the HDMI pins, one grounding pin, a pair of the HDMI pins, one grounding pin, a pair of the HDMI pins, one grounding pin, a pair of the HDMI pins, the hot plug detection pin, a pair of the USB 3.0 pins, one grounding pin, a pair of the USB 3.0 pins, and the serial port data sending pin, and a second side of the socket is arranged in sequence with one DDC data pin, the standby control pin, a pair of the network data pins, one grounding pin, a pair of the network data pins, one grounding pin, a pair of the network data pins, one grounding pin, a pair of the network data pins, one grounding pin, a pair of the USB 2.0 pins, the power switch control pin, a pair of the USB 2.0 pins, and the serial port data receiving pin, wherein the first side is opposite to the second side.

In some sockets, the connector further includes a circuit board, and the socket is welded on an edge of the circuit board, a first surface of the circuit board is divided into a first wire region and a second wire region, and a distance between the first wire region and the socket is greater than that between the second wire region and the socket, the first wire region is arranged with first welding spots, second welding spots, first wires, and second wires, the first welding spots are electrically connected with the first wires, and the second welding spots are electrically connected with the second wires, the second welding spots are respectively located on both sides of a pair of adjacent first welding spots, the second wires are respectively located on both sides of a pair of adjacent first wires, the first welding spots are configured to weld a part of the first pins in the socket, and the second welding spots are configured to weld a part of the second pins in the socket.

The HDMI pins and the USB 3.0 pins are welded on the first welding spots in the first wire region.

The electronic device provided by the embodiment of the present disclosure includes a connector, and the connector includes first pins and second pins. A pair of adjacent first pins are configured to transmit a high-speed first signal. The second pins are respectively located on both sides of a pair of the first pins. The second pins are configured to be grounded or transmit a low-speed second signal when the first pins transmit the first signal. The second pins for transmitting the low-speed second signal also play a role of isolating ground while transmitting the second signal, and are multiplexed as pins for isolating ground, which reduce the number of grounding pins used for grounding, and reduce production costs. The two second pins are respectively located on both sides of a pair of first pins, and wrap the pair of first pins to be grounded, so as to reduce the crosstalk between the first signals transmitted on two adjacent pairs of first pins. The second wires used for transmitting an HDMI power signal, the second wires used for transmitting a hot plug detection signal, and the second wires used for sending serial port data transmit the low-speed second signal when the first wires used for transmitting the HDMI video signal and USB 3.0 data signal transmit the high-speed first signal. The second wires used for transmitting the HDMI power signal and the second wires used for transmitting the hot plug detection signal are multiplexed as an isolated grounding wire, which reduce the number of grounding pins used for grounding. The second wires are arranged on both sides of a pair of first wires, and wrap the pair of first wires to be grounded, so as to reduce the crosstalk between the first signals transmitted on two adjacent pairs of first wires. In addition, arranging the first wires used for transmitting the HDMI video signal in the first wire region can ensure that each pair of first wires used for transmitting the HDMI video signal can be provided with second wires on both sides, which reduces the coupling between the two adjacent pairs of the HDMI video signal wires, thereby reducing crosstalk and ensuring the integrity of the HDMI video signal.

Embodiment 3

The open pluggable specification (OPS) is a standardized digital signage interface specification jointly developed by Intel and display manufacturers. The internal composition of the OPS computer is a mini computer with an X86 architecture, which is equipped with a processor, memory, hard disk, multiple input and output interfaces, and Windows operation interface, which is equivalent to a computer host.

The application of the existing OPS computer is usually realized through two parts—the first part is an OPS computer, and the second part is an OPS connector. The OPS connector is a bridge to connect the OPS computer and the internal circuit of the all-in-one machine or the TV, and can supply the power inside the all-in-one machine or the TV to the OPS computer through the OPS interface. The HDMI video signal, the USB port signal, and the turning-on/off control signal of the OPS computer are output through the OPS connector. In this way, the OPS computer and the all-in-one machine only need to be plugged and unplugged to realize the docking use.

The signals in the connector, such as HDMI, Gigabit network, and USB 3.0, are signals with higher transmission rate. High-speed signals have higher grounding requirements. In order to ensure that high-speed signal indicators such as crosstalk, impedance and other indicators meet the standards, according to the requirements of the signal protocol, usually the differential pairs should be wrapped to be grounded. However, if strictly in accordance with the requirements for grounding between differential pairs, at least the following signal grounds are required:

HDMI—for 4 differential pairs, 4 signal grounds are required,

USB 3.0—for 2 differential pairs, 2 signal grounds are required,

Gigabit network—for 4 differential pairs, 4 signal grounds are required,

USB 2.0—for 2 pairs of USB 2.0, 1 signal ground is required,

Therefore, in addition to the 4 power grounding pins, additionally 11 signal grounding pins are required, which complicate the structure of the OPS connector and increase the production cost.

Figure 16:
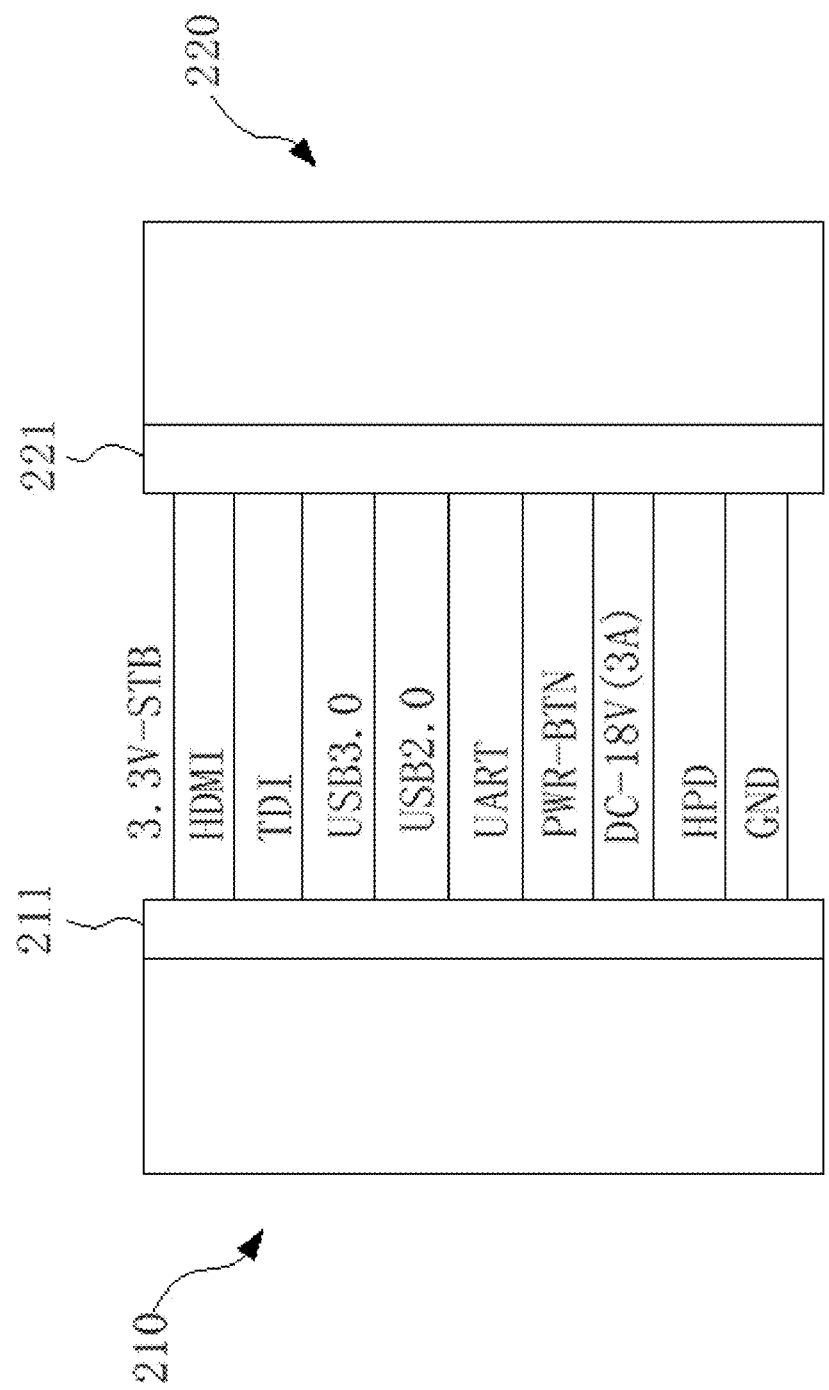
FIG. 16 is a schematic structure diagram of an OPS device provided by embodiments of the present disclosure.

The embodiment of the present disclosure provides an OPS device. FIG. 16 is a schematic structure diagram of an OPS device provided by an embodiment of the present disclosure. As shown in FIG. 16, the device includes an OPS computer host 210 and an all-in-one machine 220. Thereinto, the all-in-one machine 220 refers to integrating a host of a traditional split desktop computer into a display to form an all-in-one machine.

The OPS computer host 210 includes a first connector 211, the first connector 211 includes a male plug, and the male plug includes first pins and second pins, a pair of adjacent first pins are configured to transmit a host signal generated by the OPS computer host 210 to the all-in-one machine 220, or receive an external signal from the all-in-one machine 220, the second pins are respectively located on both sides of a pair of first pins, the second pins are configured to be grounded, or receive a first target signal from the all-in-one machine, or transmit a second target signal to the all-in-one machine, and the transmission rates of the host signal and the external signal are greater than those of the first target signal and the second target signal.

Exemplarily, the host signal and the external signal include at least one of an HDMI video signal, a network data signal, a USB 3.0 data signal, a USB 2.0 data signal, and a DDC signal. The first target signal and the second target signal include at least one of a hot plug signal, an HDMI power signal, a serial port data signal, a standby control signal, and a power switch control signal.

In a specific embodiment, the schematic diagram of the pin layout of the male plug is shown in FIG. 6.

The first connector 211 further includes a first circuit board, the male socket is welded on the first circuit board, and the first circuit board can be integrated on the main board of the OPS computer host 210. The first surface of the first circuit board is divided into a first wire region and a second wire region, and the distance between the first wire region and the male plug is greater than that between the second wire region and the male plug.

First welding spots, second welding spots, first wires, and second wires are arranged in the first wire region, the first welding spots are electrically connected with the first wires, and the second welding spots are electrically connected with the second wires, the second welding spots are respectively located on both sides of a pair of adjacent first welding spots, the second wires are respectively located on both sides of a pair of adjacent first wires, the first welding spots are configured to weld a part of the first pins in the socket, and the second welding spots are configured to weld a part of the second pins in the socket.

In a specific embodiment, the first wire region includes 20 welding spots, corresponding to the 20 pins on the first side of the socket in FIG. 6 of the present disclosure, and the second wire region includes 20 welding spots, corresponding to the 20 pins on the second side of the socket in FIG. 6 of the present disclosure. Each of the pins is welded to the corresponding welding spot. In the first wire region, the 20 welding spots from top to bottom are welded correspondingly to Pin Nos. 1-20 on the first side of the male plug in sequence. In the second wire region, the 20 welding spots from top to bottom are welded correspondingly to Pin Nos. 21-40 on the second side of the male connector in sequence.

The male plug further includes 40 contact pins that are electrically connected with the pins of the male plug.

The all-in-one machine 220 includes a second connector 221. The second connector 221 includes a female plug. The male plug is configured to be inserted into the female plug. The female plug includes:

third pins and fourth pins, a pair of adjacent third pins are configured to transmit an external signal generated by the all-in-one machine 220 to the OPS computer host 210, or receive a host signal from the OPS computer host 210, the fourth pins are respectively located on both sides of a pair of third pins, and the fourth pins are configured to be grounded, or receive the second target signal from the OPS computer host, or transmit the first target signal to the OPS computer host.

In a specific embodiment, a schematic diagram of the pin layout of the female connector is shown in FIG. 6.

The second connector 221 further includes a second circuit board, the female socket is welded on the second circuit board, and the second circuit board can be integrated on the main board of the all-in-one machine 220. The first surface of the second circuit board is divided into a first wire region and a second wire region, and the distance between the first wire region and the female plug is greater than that between the second wire region and the female plug.

First welding spots, second welding spots, first wires, and second wires are arranged in the first wire region, the first welding spots are electrically connected with the first wires, and the second welding spots are electrically connected with the second wires, the second welding spots are respectively located on both sides of a pair of adjacent first welding spots, the second wires are respectively located on both sides of a pair of adjacent first wires, the first welding spots are configured to weld a part of the first pins in the socket, and the second welding spots are configured to weld a part of the second pins in the socket.

In a specific embodiment, the first wire region includes 20 welding spots, corresponding to the 20 pins on the first side of the socket in FIG. 6 of the present disclosure, and the second wire region includes 20 welding spots, corresponding to the 20 pins on the second side of the socket in FIG. 6 of the present disclosure. Each of the pins is welded to the corresponding welding spot. In the first wire region, the 20 welding spots from top to bottom are welded correspondingly to Pin Nos. 1-20 on the first side of the male plug in sequence. In the second wire region, the 20 welding spots from top to bottom are welded correspondingly to Pin Nos. 21-40 on the second side of the male connector in sequence.

The female plug further includes 40 jacks that are correspondingly and electrically connected with respective pins of the female plug.

The contact pins are configured to be inserted into the jacks, so as to realize the pluggable connection between the OPS computer host 210 and the all-in-one machine 220.

Specifically, when the male plug is inserted into the female plug, the all-in-one machine 220 transmits a main power signal (18V, 3 A) to the OPS computer host 210 through the main power pin, so as to power up the OPS computer host 210. The all-in-one machine 220 sends a power switch control signal to the OPS computer host 210 through the power switch control pin, so as to control the OPS computer host 210 to turn on or off. The all-in-one machine 220 sends a standby control signal to the OPS computer host 210 through the standby control pin, so as to control the OPS computer host 210 to enter or exit a standby state. The all-in-one machine 220 sends display information (such as resolution, scanning frequency, etc.) to the OPS computer host 220 through the DDC pin, and the OPS computer host 220 determines the communication method between the display and the OPS computer host 210 according to the display information. The all-in-one machine 220 transmits the HDMI power signal to the OPS computer host 210 through the HDMI power pin, so as to convert the HDMI video signal into an analog RGB signal such as VGA. The all-in-one machine 220 transmits the hot plug detection signal to the OPS computer host 210 through the hot plug detection pin. When the all-in-one machine 220 is connected to or disconnected from the OPS computer host 210 through the connector, the OPS computer host 210 can detect this event through the hot plug detection pin and make a response. The OPS computer host 210 sends serial port data to the all-in-one machine 220 through the serial port data sending pin, and receives the serial port data sent from the all-in-one 220 through the serial port data receiving pin. The OPS computer host 210 sends the HDMI video signal to the all-in-one machine 220, or receives the HDMI video signal from the all-in-one machine 220 through the HDMI pin. The OPS computer host 210 sends the USB 3.0 data signal to the all-in-one machine 220, or receives the USB 3.0 data signal from the all-in-one machine 220 through the USB 3.0 pins. The OPS computer host 210 sends the USB 2.0 data signal to the all-in-one machine 220, or receives the USB 2.0 data signal from the all-in-one machine 220 through the USB 2.0 pins. The OPS computer host 210 sends the network data signal to the all-in-one machine 220 through the network data pins.

The OPS device provided by the embodiment of the present disclosure includes an OPS computer host and an all-in-one machine, the OPS computer host and the all-in-one machine are connected through a connector, and the connector includes a male plug and a female plug. HDMI power pins, hot plug detection pins, serial port data sending pins, standby control pins, power switch control pins, and serial port data receiving pins of the male plug and the female plug transmit a low-speed second signal when the first pins transmit a high-speed first signal. The HDMI power pins, the hot plug detection pins, the serial port data sending pins, the standby control pins, the power switch control pins, and the serial port data receiving pins are multiplexed as pins for isolating ground, which reduce the number of grounding pins used for grounding and reduce the production cost. The two second pins are respectively located on both sides of a pair of first pins, and wrap the pair of first pins to be grounded, so as to reduce crosstalk between the first signals transmitted by two adjacent pairs of first pins. The second wires used for transmitting the HDMI power signal, the second wires used for transmitting the hot plug detection signal, and the second wires used for sending the serial port data transmit the low-speed second signal when the first wires used for transmitting the HDMI video signal and the USB 3.0 data signal transmit the high-speed first signal. The second wires used for transmitting the HDMI power signal and the second wires used for transmitting the hot plug detection signal are multiplexed as isolated grounding wires, which reduce the number of grounding pins used for grounding. The two second wires are respectively arranged on both sides of a pair of first wires, and wrap the pair of first wires to be grounded, so as to reduce the crosstalk between the first signals transmitted on two adjacent pairs of first wires. In addition, arranging the first wires used for transmitting the HDMI video signal in the first wire region can ensure that each pair of first wires used for transmitting the HDMI video signal can be provided with second wires on both sides, which reduce the coupling between the two adjacent pairs of the HDMI video signal wires, thereby reducing the crosstalk and ensuring the integrity of the HDMI video signal.

In the description of the present disclosure, it should be noted that the terms "upper," "lower," "right," and other orientations or positional relationships are based on the orientations or positional relationships shown in the drawings, and are only for the convenience of description and the simplification of operation, rather than indicating or implying that the mentioned device or element must have a specific orientation, or be constructed and operated in a specific orientation; therefore, they cannot be understood as a limitation of the present disclosure. In addition, the terms "first" and "second" are only used to distinguish them in description and have no special meaning.

In the description of this specification, the description with reference to the terms "an embodiment," "example," etc. means that the specific feature, structure, material or characteristic described in conjunction with the embodiment or example is included in at least one embodiment or example of the present disclosure. In this description, the schematic representations of the above-mentioned terms do not necessarily refer to the same embodiment or example.

In addition, it should be understood that although this description is described in accordance with the implementation approaches, each implementation approach does not necessarily include only one independent technical solution. This narration in the description is only for clarity, and those skilled in the art should regard the description as a whole. The technical solutions in the various embodiments can also be appropriately combined to form other implementations that can be understood by those skilled in the art.

The technical principles of the present disclosure have been described above in conjunction with specific embodiments. These descriptions are only for explaining the principle of the present disclosure, and cannot be interpreted as a limitation on the claimed scope of the present disclosure in any way. Based on the explanation herein, those skilled in the art can think of other specific implementation approaches of the present disclosure without creative work, and these approaches will fall within the claimed scope of the present disclosure.

What is claimed is:
1. A connector, comprising:
   a plurality of first pins; and
   a plurality of second pins, wherein
     a pair of two adjacent first pins of the plurality of first pins are configured to transmit a first signal,
     the plurality of second pins are configured to be grounded or transmit a second signal,
     at least two of the plurality of second pins are arranged on both sides of the pair of two adjacent first pins, and
     a transmission rate of the first signal is greater than that of the second signal,
     wherein when the plurality of first pins comprise High Definition Multimedia Interface (HDMI) pins, the plurality of second pins located on both sides of the HDMI pins comprise:
       an HDMI power pin;
       three HDMI grounding pins; and
       a hot plug detection pin, wherein
         the HDMI pins are configured to transmit an HDMI video signal,
         the HDMI power pin is configured to transmit an HDMI power signal,
         the HDMI grounding pins are configured to be grounded, and
         the hot plug detection pin is configured to transmit a hot plug detection signal; or
     wherein when the plurality of first pins comprise Universal Serial Bus (USB) 3.0 pins, the plurality of second pins located on both sides of the USB 3.0 pins comprise:
       a serial port data sending pin; and
       a USB 3.0 grounding pin, wherein
         the USB 3.0 pins are configured to transmit a USB 3.0 data signal,
         the USB 3.0 grounding pin is configured to be grounded, and
         the serial port data sending pin is configured to transmit a serial port data signal.

2. The connector according to claim 1, wherein the first signal comprises at least one of:
   an HDMI video signal;
   a network data signal;
   a USB 3.0 data signal;
   a USB 2.0 data signal; and
   a Display Data Channel (DDC) signal,
   wherein the second signal comprises at least one of:
     a hot plug signal;
     an HDMI power signal;
     a serial port data signal;
     a standby control signal; and
     a power switch control signal.

3. The connector according to claim 1, wherein four pairs of the plurality of first pins are the HDMI pins.

4. The connector according to claim 3, wherein the plurality of first pins further comprise:
   two DDC pins, wherein the DDC pins are configured to transmit a DDC signal.

5. The connector according to claim 1, wherein two pairs of the plurality of first pins are the USB 3.0 pins.

6. The connector according to claim 1, wherein four pairs of the plurality of first pins are network data pins, and the plurality of second pins located on both sides of the network data pins comprise:
   a standby control pin; and
   four grounding pins, wherein
     the network data pins are configured to transmit a network data signal, the standby control pin is configured to transmit a standby control signal, and
the grounding pins are configured to be grounded.

7. The connector according to claim 1, wherein two pairs of the plurality of first pins are USB 2.0 pins, and the plurality of second pins located on both sides of the USB 2.0 pins comprise:
a serial port data receiving pin; and
a power switch control pin, wherein
the USB 2.0 pins are configured to transmit a USB 2.0 data signal,
the serial port data receiving pin is configured to receive a serial port data signal, and
the power switch control pin is configured to transmit a power switch control signal.

8. The connector according to claim 1, wherein the plurality of first pins comprise:
four pairs of HDMI pins;
two pairs of USB 3.0 pins;
two pairs of USB 2.0 pins;
four pairs of network data pins; and
two DDC pins, wherein the two DDC pins comprises:
a DDC clock pin; and
a DDC data pin,
wherein the plurality of second pins comprises:
an HDMI power pin;
a hot plug detection pin;
a serial port data sending pin;
a serial port data receiving pin;
a standby control pin;
a power switch control pin; and
eight grounding pins,
wherein a first side of the connector is arranged in sequence with the DDC clock pin, the HDMI power pin, a first pair of the four pairs of HDMI pins, a first grounding pin of the grounding pins, a second pair of the four pairs of HDMI pins, a second grounding pin of the grounding pins, a third pair of the four pairs of HDMI pins, a third grounding pin of the grounding pins, a fourth pair of the four pairs of HDMI pins, the hot plug detection pin, a first pair of the two pairs of USB 3.0 pins, a fourth grounding pin of the grounding pins, a second pair of the two pairs of USB 3.0 pins, and the serial port data sending pin,
wherein a second side of the connector is arranged in sequence with the DDC data pin, the standby control pin, a first pair of the four pairs of network data pins, a fifth grounding pin of the grounding pins, a second pair of the four pairs of network data pins, a sixth grounding pin of the grounding pins, a third pair of the four pairs of network data pins, a seventh grounding pin of the grounding pins, a fourth pair of the four pairs of network data pins, an eighth grounding pin of the grounding pins, a first pair of the two pairs of USB 2.0 pins, the power switch control pin, a second pair of the two pairs of USB 2.0 pins, and the serial port data receiving pin, and
wherein the first side is opposite to the second side.

9. The connector according to claim 1, wherein the plurality of first pins comprise:
HDMI pins; and
USB 3.0 pins, and the connector further comprises:
a circuit board,
wherein a first surface of the circuit board is divided into a first wire region and a second wire region, a distance between the first wire region and an edge of the circuit board is greater than that between the second wire region and the edge of the circuit board, and both the HDMI pins and the USB 3.0 pins are welded in the first wire region.

10. The connector according to claim 9, wherein the first wire region is arranged with first welding spots, second welding spots, first wires, and second wires, wherein
the first welding spots are electrically connected with the first wires,
the second welding spots are electrically connected with the second wires,
the second welding spots are arranged on both sides of a pair of adjacent first welding spots,
the second wires are arranged on both sides of a pair of adjacent first wires,
the first welding spots are configured to weld the plurality of first pins, and
the second welding spots are configured to weld the plurality of second pins.

11. The connector according to claim 10, wherein four pairs of the first wires are HDMI wires, and the second wires comprise:
an HDMI power wire;
three grounding wires; and
a hot plug detection wire,
wherein four pairs of the first pins are HDMI pins, and the second pins comprise:
an HDMI power pin;
three grounding pins; and
a hot plug detection pin,
wherein four pairs of the first welding spots are HDMI welding spots, and the second welding spots comprise:
an HDMI power welding spot;
three grounding welding spots; and
a hot plug detection welding spot, wherein
the HDMI welding spot is configured to weld the HDMI pins,
the HDMI wire is electrically connected with the HDMI welding spot for transmitting an HDMI video signal,
the HDMI power welding spot is configured to weld the HDMI power pin,
the HDMI power wire is electrically connected with the HDMI power welding spot for transmitting an HDMI power signal,
the grounding welding spots are configured to weld the grounding pins,
the grounding wires are electrically connected with the grounding welding spots for grounding,
the hot plug detection welding spot is configured to weld the hot plug detection pin, and
the hot plug detection wire is electrically connected with the hot plug detection welding spot for transmitting a hot plug detection signal.

12. The connector according to claim 10, wherein two pairs of the first wires are USB 3.0 wires, and the second wires comprise:
a serial port data sending wire; and
a grounding wire,
wherein two pairs of the first pins are USB 3.0 pins, and the second pins comprise:
a serial port data sending pin; and
a grounding pin,
wherein two pairs of the first welding spots are USB 3.0 welding spots, and the second welding spots comprise:
a serial port data sending welding spot; and
a grounding welding spot, wherein
the USB 3.0 welding spots are configured to weld the USB 3.0 pins, the USB 3.0 wires are electrically connected with the USB 3.0 welding spots for transmitting a USB 3.0 data signal, the grounding welding spot is configured to weld the grounding pin, the grounding wire is electrically connected with the grounding welding spot for grounding, the serial port data sending welding spot is configured to weld the serial port data sending pin, and the serial port data sending wire is electrically connected with the serial port data sending welding spot for sending a serial port data signal.

13. The connector according to claim 10, wherein the second wire region is arranged with third welding spots, fourth welding spots, third wires, and fourth wires, wherein the third welding spots are electrically connected with the third wires, and at least one of the fourth welding spots is electrically connected with a grounding welding pad on the second surface of the circuit board through a via hole penetrating the circuit board, the second surface is a surface opposite to the first surface, the remaining fourth welding spots are electrically connected with the fourth wires, and the fourth welding spots are arranged on both sides of a pair of adjacent third welding spots, wherein the third welding spots are configured to weld the plurality of first pins, and the fourth welding spots are configured to weld the plurality of second pins.

14. The connector according to claim 13, wherein four pairs of the third wires are network data wires, and the fourth wires comprise:

a standby control wire; and a grounding wire located between two pairs of the network data wires, wherein four pairs of the first pins are network data pins, and the second pins comprise:

a standby control pin; and four grounding pins, wherein four pairs of the third welding spots are network data welding spots, and the fourth welding spots comprise:

a standby control welding spot; and a grounding welding spot located between two pairs of the network data wires, wherein the network data welding spots are configured to weld the network data pins, the network data wires are electrically connected with the network data welding spots for transmitting a network data signal, the standby control welding spot is configured to weld the standby control pin, the standby control wire is electrically connected with the standby control welding spot for transmitting a standby control signal, and the grounding welding spot is configured to weld the grounding pins, and the grounding wire is electrically connected with the grounding welding spot for grounding.

15. The connector according to claim 13, wherein two pairs of the third wires are USB 2.0 wires, and the fourth wires comprise:

a power switch wire; and a serial port data receiving wire, wherein two pairs of the first pins are USB 2.0 pins, the second pins located on both sides of the USB 2.0 pins comprise a serial port data receiving pin and a power switch control pin, two pairs of the third welding spots are USB 2.0 welding spots, the fourth welding spots comprise a power switch welding spot and a serial port data receiving welding spot, the USB 2.0 welding spots are configured to weld the USB 2.0 pins, the USB 2.0 wires are electrically connected with the USB 2.0 welding spots for transmitting a USB 2.0 data signal, the power switch welding spot is configured to weld the power switch control pin, the power switch wire is electrically connected with the power switch control welding spot for transmitting a power switch control signal, the serial port data receiving welding spot is configured to weld the serial port data receiving pin, and the serial port data receiving wire is electrically connected with the serial port data receiving welding spot for receiving a serial port data signal.

16. The connector according to claim 10, wherein the first welding spots comprise:

a DDC clock welding spot;

four pairs of HDMI welding spots; and two pairs of USB 3.0 welding spots, wherein the second welding spots comprise:

an HDMI power welding spot;

four grounding welding spots;

a hot plug detection welding spot; and a serial port data sending welding spot, wherein the first wire region is arranged in sequence with the DDC clock welding spot, the HDMI power welding spot, a first pair of HDMI welding spots, a first grounding welding spot, a second pair of HDMI welding spots, a second grounding welding spot, a third pair of HDMI welding spots, a third grounding welding spot, a fourth pair of HDMI welding spots, a hot plug detection welding spot, a first pair of USB 3.0 welding spots, a fourth grounding welding spot, a second pair of USB 3.0 welding spots, and the serial port data sending welding spot, wherein the first wires comprise:

a DDC clock wire;

four pairs of HDMI wires; and two pairs of USB 3.0 wires, wherein the second wires comprise:

an HDMI power wire;

four grounding wires;

a hot plug detection wire; and a serial port data sending wire, wherein the DDC clock welding spot is electrically connected with the DDC clock wire, the HDMI power welding spot is electrically connected with the HDMI power wire, the HDMI welding spots are electrically connected with the HDMI wires, the hot plug detection welding spot is electrically connected with the hot plug detection wire, the grounding welding spots are electrically connected with the grounding wires, the USB 3.0 welding spots are electrically connected with the USB 3.0 wire, and the serial port data sending welding spot is electrically connected with the serial port data sending wire.

17. The connector according to claim 13, wherein the third welding spots comprise:
   a DDC data welding spot;
   four pairs of network data welding spots; and
   two pairs of USB 2.0 welding spots,
wherein the fourth welding spots comprise:
   a standby control welding spot;
   four grounding welding spots;
   a power switch welding spot; and
   a serial port data receiving welding spot, wherein
   the second wire region is arranged in sequence with the DDC data welding spot, the standby control welding spot, a first pair of network data welding spots, a first grounding welding spot, a second pair of network data welding spots, a second grounding welding spot, a third pair of network data welding spots, a third grounding welding spot, a fourth pair of network data welding spots, a fourth grounding welding spot, a first pair of USB 2.0 welding spots, the power switch welding spot, a second pair of USB 2.0 welding spots, and the serial port data receiving welding spot,
wherein the third wires comprise:
   a DDC data wire;
   four pairs of network data wires; and
   two pairs of USB 2.0 wires,
wherein the fourth wires comprise:
   a standby control wire;
   a power switch wire; and
   a serial port data receiving wire, wherein
   the DDC data welding spot is electrically connected with the DDC data wire,
   the standby control welding spot is electrically connected with the standby control wire,
   the network data welding spots are electrically connected with the network data wires,
   at least one of the grounding welding spots is electrically connected with a grounding welding pad on the second surface of the circuit board through the via hole penetrating the circuit board,
   the USB 2.0 welding spots are electrically connected with the USB 2.0 wires,
   the power switch welding spot is electrically connected with the power switch wire, and
   the serial port data receiving welding spot is electrically connected with the serial port data receiving wire.

18. An electronic device having a connector, wherein the connector comprises:
   a plurality of first pins; and
   a plurality of second pins, wherein
   a pair of two adjacent first pins of the plurality of first pins are configured to transmit a first signal,
   the plurality of second pins are configured to be grounded or transmit a second signal,
   at least two of the plurality of second pins are arranged on both sides of the pair of two adjacent first pins, and
   a transmission rate of the first signal is greater than that of the second signal,
   wherein when the plurality of first pins comprise HDMI pins, the plurality of second pins located on both sides of the HDMI pins comprise:
      an HDMI power pin;
      three first grounding pins; and
      a hot plug detection pin, wherein
         the HDMI pins are configured to transmit an HDMI video signal,
         the HDMI power pin is configured to transmit an HDMI power signal,
         the first grounding pins are configured to be grounded, and
         the hot plug detection pin is configured to transmit a hot plug detection signal; or
   wherein when the plurality of first pins comprise USB 3.0 pins, the plurality of second pins located on both sides of the USB 3.0 pins comprise:
      a serial port data sending pin; and
      a second grounding pin, wherein
         the USB 3.0 pins are configured to transmit a USB 3.0 data signal,
         the second grounding pin is configured to be grounded, and
         the serial port data sending pin is configured to transmit a serial port data signal.

19. The connector according to claim 1, wherein the pair of two adjacent first pins are surrounded by the at least two of the plurality of second pins for isolating ground.

20. A connector, comprising:
   a plurality of first pins;
   a plurality of second pins; and
   a circuit board, wherein
   a pair of two adjacent first pins of the plurality of first pins are configured to transmit a first signal,
   the plurality of second pins are configured to be grounded or transmit a second signal,
   at least two of the plurality of second pins are arranged on both sides of the pair of two adjacent first pins, and
   a transmission rate of the first signal is greater than that of the second signal,
   wherein the plurality of first pins comprise:
      HDMI pins; and
      USB 3.0 pins,
      wherein a first surface of the circuit board is divided into a first wire region and a second wire region, a distance between the first wire region and an edge of the circuit board is greater than that between the second wire region and the edge of the circuit board, and both the HDMI pins and the USB 3.0 pins are welded in the first wire region.

* * * * *